(12) United States Patent
Kawagishi et al.

(10) Patent No.: US 8,195,433 B2
(45) Date of Patent: Jun. 5, 2012

(54) OPTIMUM VALUE SEARCH APPARATUS AND METHOD, RECORDING MEDIUM, AND COMPUTER PROGRAM PRODUCT

(75) Inventors: Hiroyuki Kawagishi, Yokohama (JP); Hisashi Matsuda, Tokyo (JP); Fumio Ootomo, Zama (JP); Asako Inomata, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1526 days.

(21) Appl. No.: 11/624,230

(22) Filed: Jan. 18, 2007

(65) Prior Publication Data

US 2007/0136377 A1    Jun. 14, 2007

Related U.S. Application Data

(63) Continuation of application No. PCT/JP2005/011625, filed on Jun. 24, 2005.

(30) Foreign Application Priority Data

Jul. 30, 2004  (JP) ................................. 2004-223978
Apr. 6, 2005   (JP) ................................. 2005-109988

(51) Int. Cl.
    *G06F 7/60*     (2006.01)
    *G06F 17/10*     (2006.01)

(52) U.S. Cl. .......................................................... 703/2
(58) Field of Classification Search .................. 703/2
See application file for complete search history.

(56) References Cited

U.S. PATENT DOCUMENTS 5,159,600 A * 10/1992 Chintapalli et al. .......... 714/738
6,546,522 B1 * 4/2003 Chen ............................. 716/115
6,564,116 B2 * 5/2003 Wang et al. ................... 700/121
6,604,092 B1 * 8/2003 Stewart .......................... 706/47

FOREIGN PATENT DOCUMENTS

JP      10-207926      8/1998
JP      2000-132535      5/2000

(Continued)

OTHER PUBLICATIONS

Boning, D.S.; Mozumder, P.K.; , "DOE/Opt: a system for design of experiments, response surface modeling, and optimization using process and device simulation," Semiconductor Manufacturing, IEEE Transactions on , vol. 7, No. 2, pp. 233-244, May 1994.*

(Continued)

*Primary Examiner* — Kandasamy Thangavelu
*Assistant Examiner* — Luke Osborne
(74) *Attorney, Agent, or Firm* — Oblon, Spivak, McClelland, Maier & Neustadt, L.L.P.

(57) ABSTRACT

This invention provides an optimum value search apparatus, method, recording medium, and computer program product used in designing, analyzing, or testing a device having a plurality of factors that have effects on a characteristic. In this method, an orthogonal array is generated by setting level values obtained from the initial values of the factors to the coordinates of a two-dimensional table including a matrix of the characteristics and the factors. From the characteristics on the orthogonal array, characteristic values obtained on the basis of combinations of the level values of the factors of a single characteristic are grasped. A combination having a most excellent characteristic value is selected. The level values of the factors in the characteristic corresponding to the selected combination are reset in the orthogonal array. After resetting, processes are repeatedly executed to search for an optimum value as a most excellent one of the characteristic values.

32 Claims, 21 Drawing Sheets

FOREIGN PATENT DOCUMENTS

| | | |
|---|---|---|
| JP | 2000-293556 | 10/2000 |
| JP | 2004-133659 | 4/2004 |

OTHER PUBLICATIONS

Pierreval, H.; Durieux, S.; , "A two-stage simulation optimization heuristic for robust design," Systems, Man and Cybernetics, 2002 IEEE International Conference on , vol. 3, No., pp. 6 pp. vol. 3, Oct. 6-9, 2002.*

Kawagishi, Hiroyuki, et al., "Development of Global Optimization Method for Design of Turbine Stages", Proceedings of GT2005, ASME Turbo Expo 2005: Power for Land, Sea and Air, Jun. 6-9, 2005, pp. 1-9.

Kawamo, Keiji, et al., "Fundamentals and Applications of Optimization Theory", Corona Publishing, Oct. 25, 2000, pp. 37-38, 77-78, 85, 195.

Chen, J.X., "Study of a New Method for the Optimization of Nonlinear Mathematical Models(1)—Multiple Nonlinear Regression Analysis", Proceedings of the Fourth Asian Congress of Fluid Mechanics, vol. 1, Aug. 21, 1989 , Hong Kong, pp. F37 to F40.

Kawagashi, Hiroyuki, "Application of Optimum Method to Design of Thermal Power Equipment", The Japan Society of Mechanical Engineers, Oct. 4, 2002, pp. 295-300.

B. Forouraghi, "A Genetic Algorithm for Multiobjective Robust Design", Applied Intelligence, The International Journal of ARTIFICIALINTELLIGENCE, XP 019204453, vol. 12, No. 3, May 1, 2000, pp. 151-161.

Kwon-Hee Lee, et al., "An Optimization Algorithm Using Orthogonal Arrays in Discrete Design Space for Structures", Finite Elements in Analysis and Design, XP 55001202, vol. 40, No. 1, Nov. 1, 2003, pp. 121-135.

Supplementary Search Report issued Jul. 13, 2011, in European Patent Application No. 05765084.8-1225 /1783642, 3 pages.

* cited by examiner

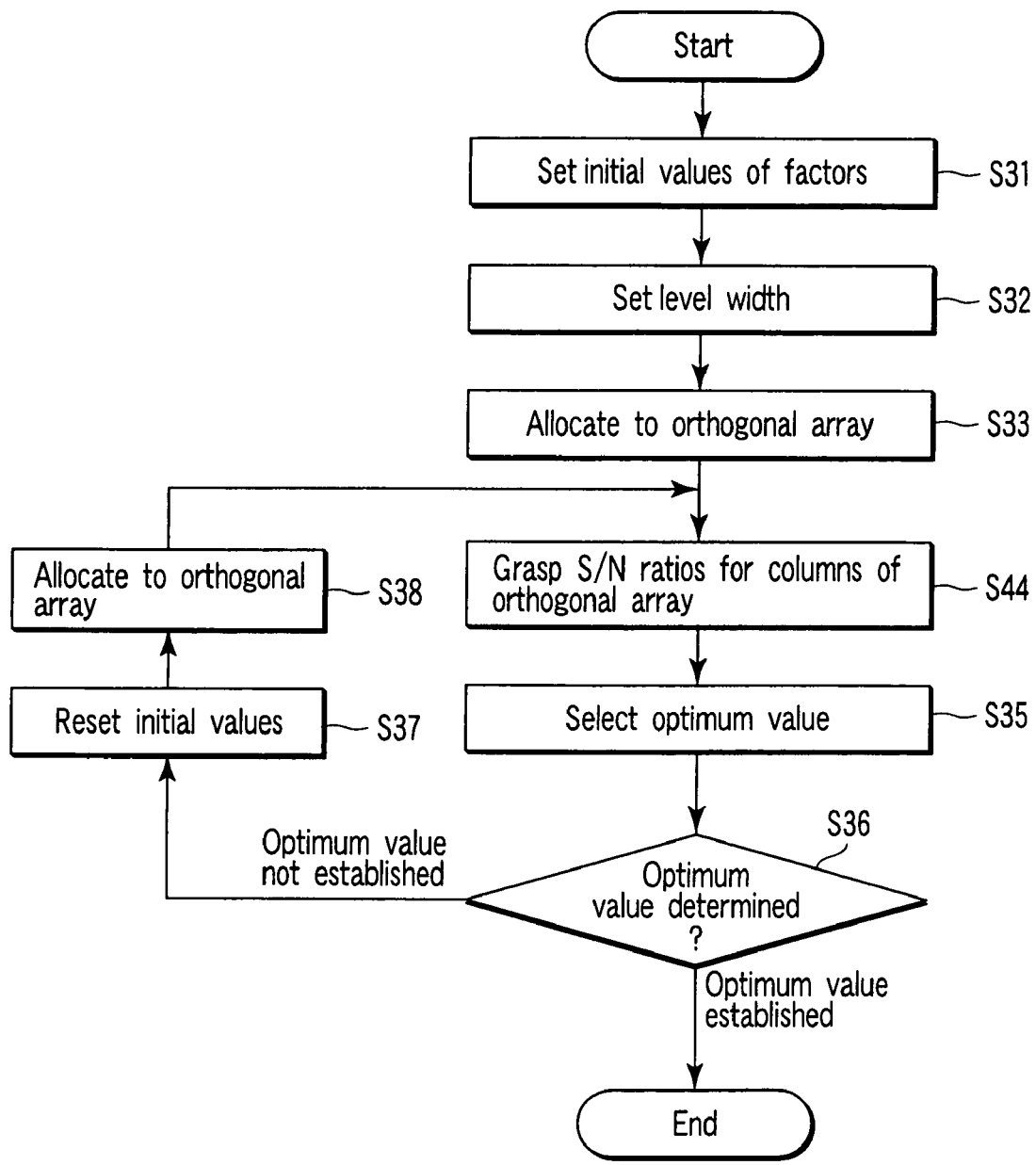
F I G. 10

FIG. 11

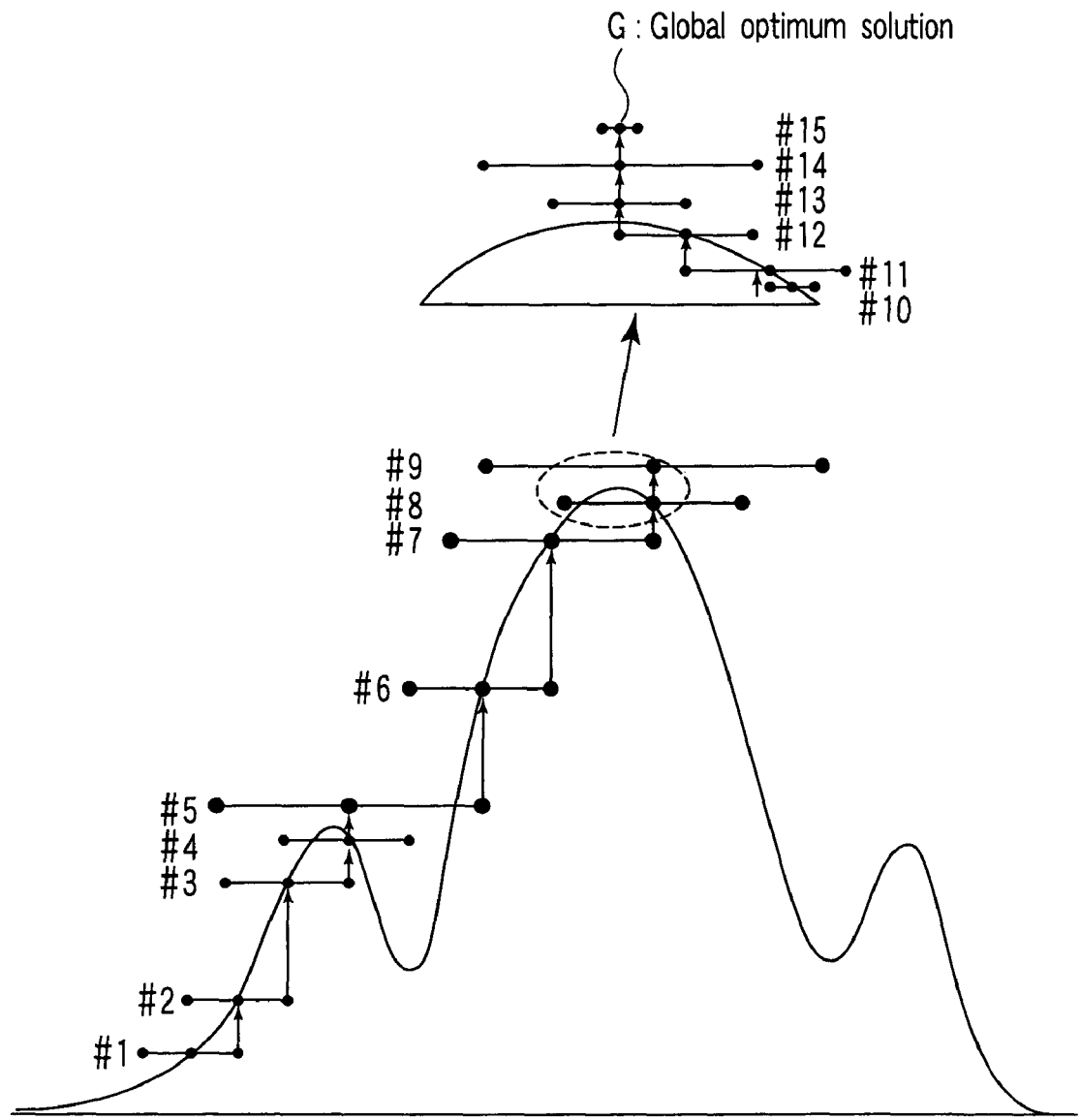
F I G. 18

| No | A | B |
|---|---|---|
| 1 | 1 | 1 |
| 2 | 1 | 2 |
| 3 | 1 | 3 |
| 4 | 2 | 1 |
| 5 | 2 | 2 |
| 6 | 2 | 3 |
| 7 | 3 | 1 |
| 8 | 3 | 2 |
| 9 | 3 | 3 |

OPTIMUM VALUE SEARCH APPARATUS AND METHOD, RECORDING MEDIUM, AND COMPUTER PROGRAM PRODUCT

CROSS REFERENCE TO RELATED APPLICATIONS

This is a Continuation Application of PCT Application No. PCT/JP2005/011625, filed Jun. 24, 2005, which was published under PCT Article 21(2) in Japanese.

This application is based upon and claims the benefit of priority from prior Japanese Patent Applications No. 2004-223978, filed Jul. 30, 2004; and No. 2005-109988, filed Apr. 6, 2005, the entire contents of both of which are incorporated herein by reference.

BACKGROUND OF THE INVENTION

1. Field of the Invention

The present invention relates to an apparatus, method, recording medium, and computer program product which search for an optimum value of a factor combination to maximize a required characteristic in, e.g., designing, analyzing, or testing a device having a plurality of factors.

2. Description of the Related Art

There are proposed various methods of searching for an optimum value of a factor combination to maximize a required characteristic in designing, analyzing, or testing a device having a plurality of factors.

The methods proposed so far include an optimum value search method using mathematical programming such as the Newton's method or sequential quadratic programming disclosed in, e.g., "Fundamentals and Applications of Optimization Theory" (Corona Publishing, 2000) and an optimum value search method using a technique based on heuristic search such as genetic algorithm or simulated annealing. A method disclosed in, e.g., Jpn. Pat. Appln. KOKAI Publication No. 10-207926 generates a response surface expression to estimate a characteristic by design of experiment and searches for an optimum value by mathematical programming. A method disclosed in, e.g., Jpn. Pat. Appln. KOKAI Publication No. 2000-132535 investigates the distribution of characteristic values obtained by an orthogonal array and estimates the search direction on the basis of the distribution, thereby searching for an optimum value.

BRIEF SUMMARY OF THE INVENTION

These conventional optimum value search methods however have the following problems.

In designing, analyzing, or testing a device, generally, a plurality of factors that have effects on the characteristic are grasped, and the optimum level of each factor is obtained by using an optimum value search apparatus to obtain the most of a required characteristic.

A conventional optimum value search apparatus will be described below with reference to FIGS. 1 to 5.

FIG. 1 is a flowchart of optimum value search using mathematical programming such as the Newton's method or sequential quadratic programming, which corresponds to the contents of "Fundamentals and Applications of Optimization Theory" (Corona Publishing, 2000). In this case, the initial value of each design factor is set (S1). Optimum solution search conditions are set (S2). An optimum value is searched for by mathematical programming (S3). The obtained optimum value is evaluated (S4).

FIG. 2 is a flowchart of optimum value search using a technique based on heuristic search such as genetic algorithm or simulated annealing, which corresponds to the contents of "Fundamentals and Applications of Optimization Theory" (Corona Publishing, 2000). In this case, the initial value of each design factor is set (S11). Optimum solution search conditions are set (S12). An optimum value is searched for by heuristic search (S13). The obtained optimum value is evaluated (S14).

FIG. 3 is a flowchart of optimum value search using response surface methodology, which corresponds to Jpn. Pat. Appln. KOKAI Publication No. 10-207926. In this case, the initial value of each design factor is set (S21). Design factors and the number of levels are set (S22) and allocated to an orthogonal array (S23). Device function calculation is done for each combination on the orthogonal array (S24) to generate a response surface expression that approximates the relationship between the characteristic values and the design factors (S25). Optimum solution search conditions are set (S26). An optimum value is searched for on the response surface expression (S27). The effect of the obtained optimum design factor combination is confirmed on an actual characteristic (S28).

In the optimum value search methods applied to the conventional optimum value search apparatus, trap by a local optimum value occurs, or an enormous computational complexity is necessary.

The optimum value search method shown in FIG. 1 using mathematical programming such as the Newton's method or sequential quadratic programming searches for an optimum value while obtaining, e.g., the gradient of a characteristic starting from an initial value. If a number of peaks (local optimum solutions K indicated by ● and a global optimum solution G indicated by ☆ in FIG. 4) indicating optimum values exist, as shown in FIG. 4, trap by the local optimum solution K may occur.

FIG. 5 shows an example of optimum value search executed by using mathematical programming in designing a product having a plurality of design factors. Referring to FIG. 5, the ordinate represents a change in initial value, and the abscissa represents a found optimum value. This graph indicates that the found optimum value largely changes as the initial value of a design factor changes.

The optimum value search method shown in FIG. 2 using a technique based on heuristic search such as genetic algorithm requires calculation of a lot of combinations. This method can obtain a global optimum value at a high probability but sometimes requires an enormous computational complexity.

The optimum value search method shown in FIG. 3 using response surface methodology searches for an optimum value on a response surface expression. Although calculation time can be short, the accuracy of the response surface expression may poses a problem. Especially when a number of design factors are present, and a number of interactions exist between them, the prediction accuracy of a response surface expression tends to be low.

Jpn. Pat. Appln. KOKAI Publication No. 2000-132535 proposes a method of investigating the distribution of characteristic values obtained by an orthogonal array and estimating the search direction on the basis of the distribution, thereby searching for an optimum value. This method needs to determine a level value that should be selected to improve each factor. A problem of a 2-level system according to an embodiment of Jpn. Pat. Appln. KOKAI Publication No. 2000-132535 assumes that a factor has a linear characteristic so that the improvement direction can be determined. However, many design problems have interactions between factors. Since a characteristic is nonlinear, it is necessary to use an orthogonal array of 3 or more levels. It is very difficult to determine the improvement direction of an individual factor on the basis of only a characteristic value distribution described in Jpn. Pat. Appln. KOKAI Publication No. 2000-132535.

The present invention has been made in consideration of the above-described situations, and has as its object to provide an apparatus, method, recording medium, and computer program product capable of searching for a global optimum value by a small number of times of calculation or trial.

In order to achieve the above object, the present invention adopts the following means.

The present invention is used in designing, analyzing, or testing a device having a plurality of factors that have effects on a characteristic. According to a first aspect, from the characteristics on an orthogonal array that sets level values obtained from initial values of the factors to coordinates of a two-dimensional table including a matrix of the characteristics and the factors, a combination having a most excellent one of characteristic values obtained on the basis of combinations of level values of the factors of a single characteristic is selected. The level values of the factors in the characteristic corresponding to the selected combination are reset in the orthogonal array. After resetting, an optimum value as a most excellent one of the characteristic values is searched for by repeatedly selecting a combination having a most excellent characteristic value.

Especially to select an optimum characteristic, from the characteristics on an orthogonal array that sets level values obtained from initial values of the factors to coordinates of a two-dimensional table including a matrix of the characteristics and the factors, a combination of level values of the factors to maximize an S/N ratio as a function based on the level values of the factors of a single characteristic and a standard deviation with reference to the level values of the factors of the single characteristic may be selected.

The width of the level value of each factor may be changed in every search. Particularly in this case, the width of the level value to be changed in every search may be decided on the basis of an optimum value obtained in every search. For example, when a variation of the optimum value obtained in every search is larger than a variation of an optimum value obtained in immediately preceding search, the width of the level value is made larger than the width of the level value in the immediately preceding search. When the variation of the optimum value obtained in every search is smaller than the variation of the optimum value obtained in immediately preceding search, the width of the level value is made smaller than the width of the level value in the immediately preceding search.

According to a second aspect of the present invention, in designing, analyzing, or testing a device having a plurality of factors, an orthogonal array is generated by allocating the factors that have effects on a characteristic of the device and level values obtained from initial values of the factors. An optimum value having a most excellent characteristic is selected from characteristic values obtained on the basis of combinations on the orthogonal array. An orthogonal array is generated by resetting, to the initial values of the factors, a combination of the level values of the factors that ensure the selected optimum value. From then, an optimum value is searched for by repeatedly executing the selection step of selecting an optimum value by using the reset orthogonal array and generating the reset orthogonal array.

If an optimum value selected in the current selection step equals an optimum value selected in the preceding selection step, a value of a level width as a difference between adjacent level values in the orthogonal array is changed so that the value of the level width is different from that of an orthogonal array to be used in the next selection step and that of an orthogonal array used in the current selection step.

For example, the value of the level width is changed on the basis of the number of times of equality holding between optimum values selected in a predetermined number of selection steps. More specifically, the level width in an orthogonal array to be used in an nth (n is an integer: $n \geq 2$) selection step is represented by a function $\overline{W}(n)$ which is given by $W(n)=A \times W(n-1)$, $A>1.0$ upon equality holding of first time between the optimum values selected in the selection steps and by $W(n)=B \times W(n-2)$, $B<1.0$ upon equality holding of second time. Conversely, the level width in an orthogonal array to be used in an nth (n is an integer: $n \geq 2$) selection step is represented by a function $\overline{W}(n)$ which is given by $W(n)=B \times W(n-1)$, $B<1.0$ upon equality holding of first time between the optimum values selected in the selection steps and by $W(n)=A \times W(n-2)$, $A>1.0$ upon equality holding of second time. Alternatively, the level width in an orthogonal array to be used in an nth (n is an integer: $n \geq 2$) selection step is represented by a function $\overline{W}(n)$ which is given by $W(n)=C \times W(n-1)$, $C<1.0$ or $C>1.0$ after equality holding between some of the optimum values selected in the selection steps until the selection step is repeated a predetermined number of times.

BRIEF DESCRIPTION OF THE SEVERAL VIEWS OF THE DRAWING

FIG. 10 is a flowchart showing the steps of processing executed by an optimum value search apparatus using an optimum value search method according to the second embodiment;

FIG. 11 is a view showing an example of an orthogonal array to obtain an S/N ratio;

FIG. 18 is a view showing a situation wherein a global optimum value is searched for in the fourth embodiment;

DETAILED DESCRIPTION OF THE INVENTION

The best mode for carrying out the present invention will be described below with reference to the accompanying drawings.

Figure 1:
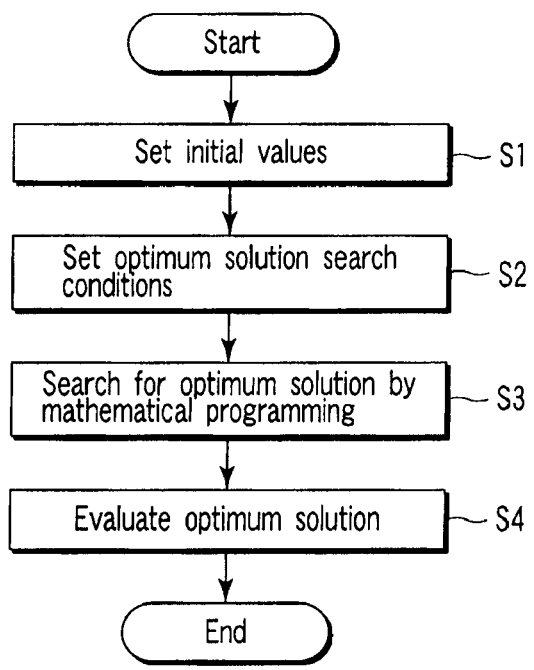
FIG. 1 is a flowchart showing the steps of processing of searching for an optimum value by using conventional mathematical programming.
Figure 2:
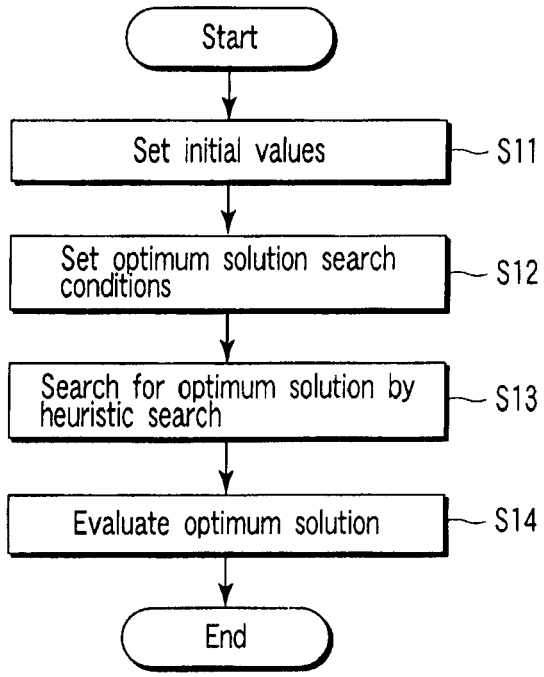
FIG. 2 is a flowchart showing the steps of processing of searching for an optimum value by using conventional heuristic search.
Figure 3:
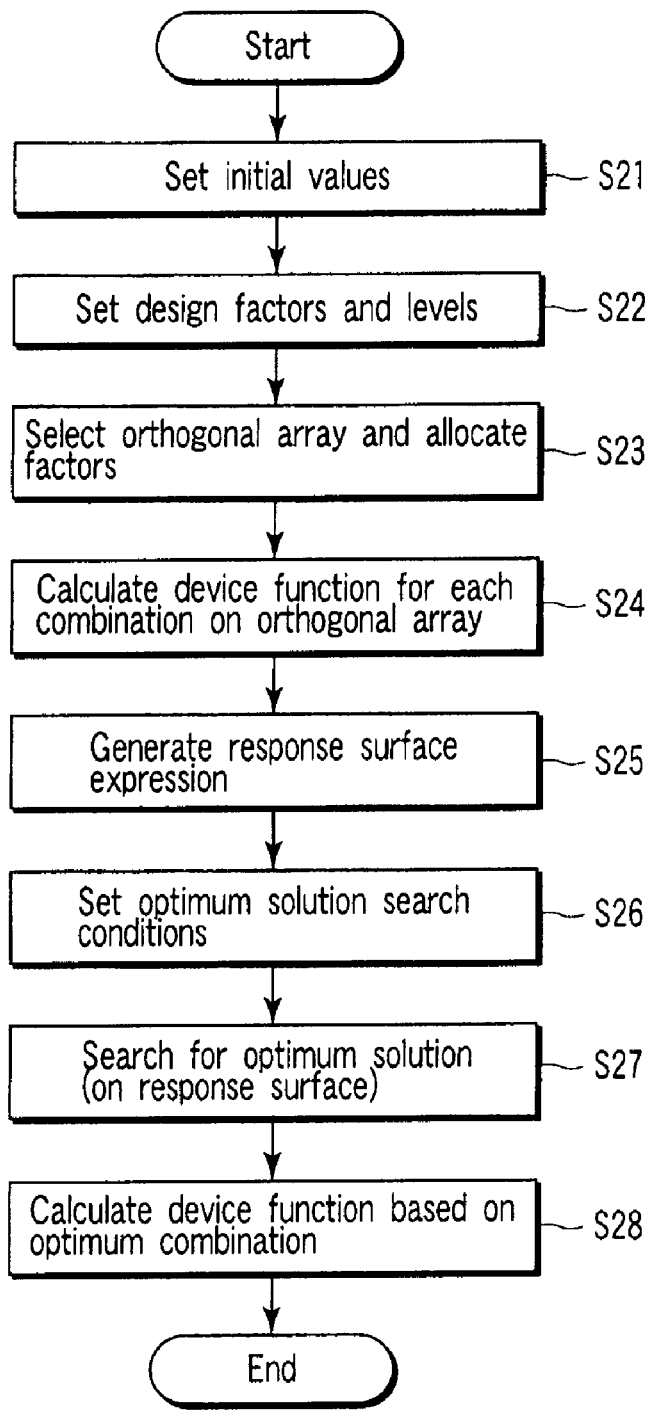
FIG. 3 is a flowchart showing the steps of processing of searching for an optimum value by using conventional response surface methodology.
Figure 4:
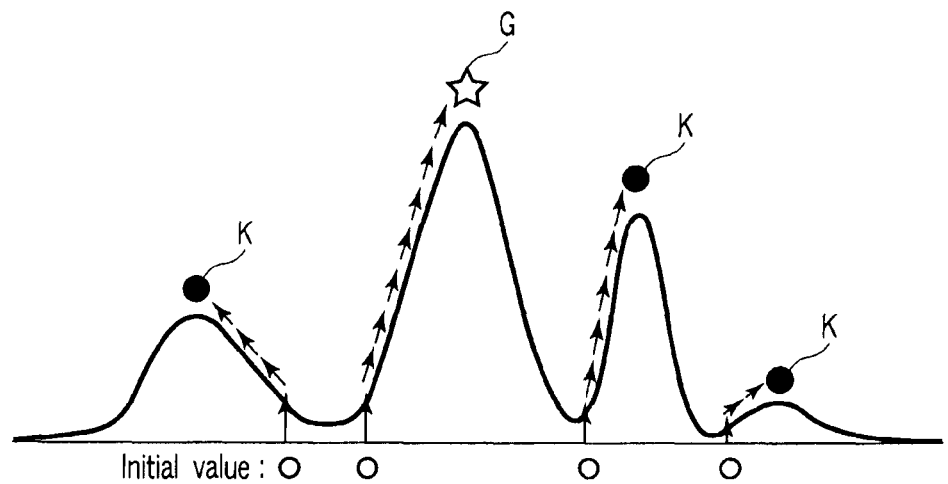
FIG. 4 is a graph for explaining a global optimum value and a local optimum value.
Figure 5:
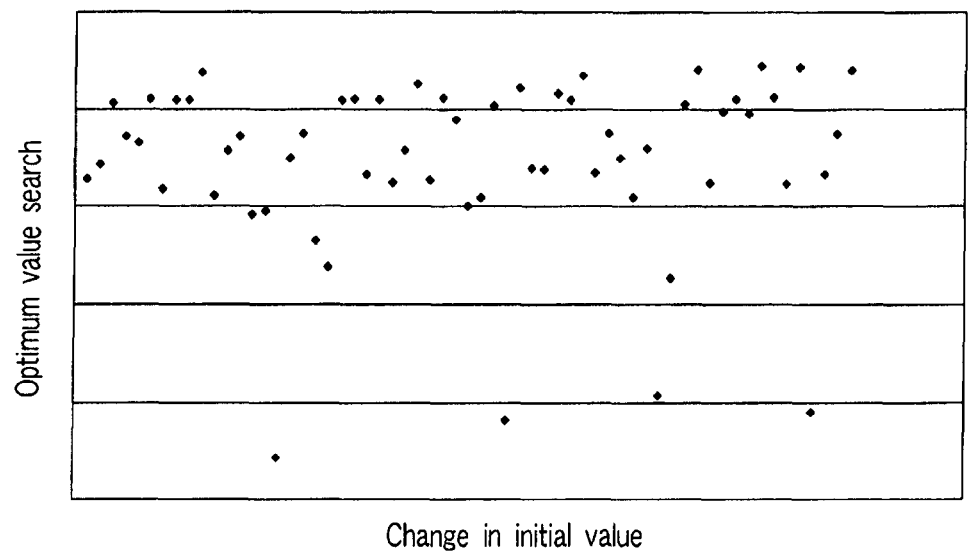
FIG. 5 is a graph showing a situation wherein a found optimum value changes depending on an initial value.
Figure 6:
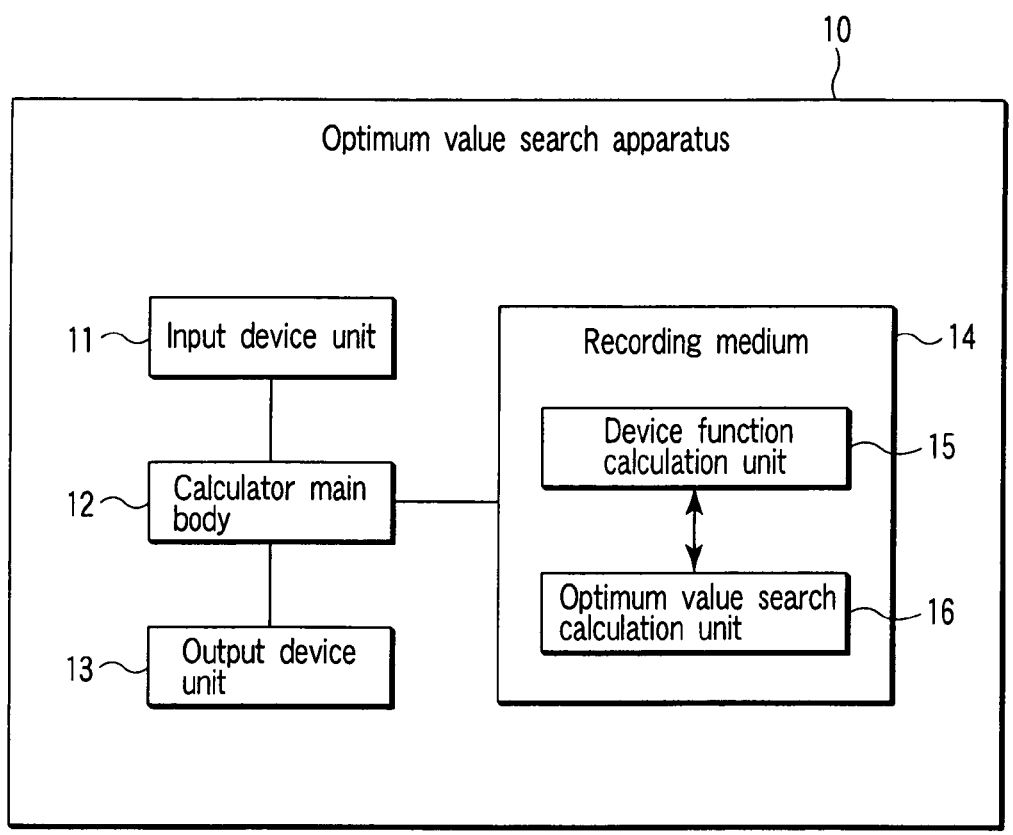
FIG. 6 is a block diagram showing an arrangement example of an optimum value search apparatus using an optimum value search method according to an embodiment of the present invention.

FIG. 6 is a block diagram showing an arrangement example of an optimum value search apparatus 10 using an optimum value search method according to an embodiment of the present invention.

The optimum value search apparatus 10 comprises an input device unit 11, calculator main body 12, output device unit 13, and recording medium 14. The recording medium 14 is not particularly limited to and can be any one of a magnetic disk, Floppy® disk, hard disk, optical disk (e.g., CD-ROM and DVD), magnetooptical disk (e.g., MO), and semiconductor memory if it is a computer-readable medium capable of storing programs and data. The recording medium 14 can be either an independent medium or part of hardware such as a hard disk or memory. The recording medium 14 may record or temporarily record a program transmitted and downloaded through a LAN or Internet.

The recording medium 14 holds, as programs executable by the calculator main body 12 serving as a computer, a device function calculation unit 15 that records a device function calculation program and an optimum value search calculation unit 16 that records an optimum value search program. In addition to the device function calculation program and optimum value search program, the recording medium 14 can also hold a setting program to form these programs, an orthogonal array (to be described later) and data structures in the calculator main body 12.

The calculator main body 12 executes processing by loading the programs recorded on the recording medium 14 or the setting program as needed, causing the programs to built a software means, and causing the software means to control operations.

The device function calculation unit 15 acquires, through the calculator main body 12, device design initial values input from the input device unit 11 and performs calculation related to device functions on the basis of the acquired initial values. The optimum value search calculation unit 16 executes optimum value search calculation applicable to, e.g., design, analysis, or test of a device by running a program complying with the optimum value search method of the present invention.

The output device unit 13 outputs calculation results from the device function calculation unit 15 and optimum value search calculation unit 16.

In the following embodiments, the optimum value search method according to the embodiment of the present invention will be described in detail. The arrangement of the optimum value search apparatus 10 shown in FIG. 6 is common and applicable to all the embodiments. Hence, a description of the arrangement of the optimum value search apparatus 10 will be omitted in the following embodiments.

First Embodiment

Figure 7:
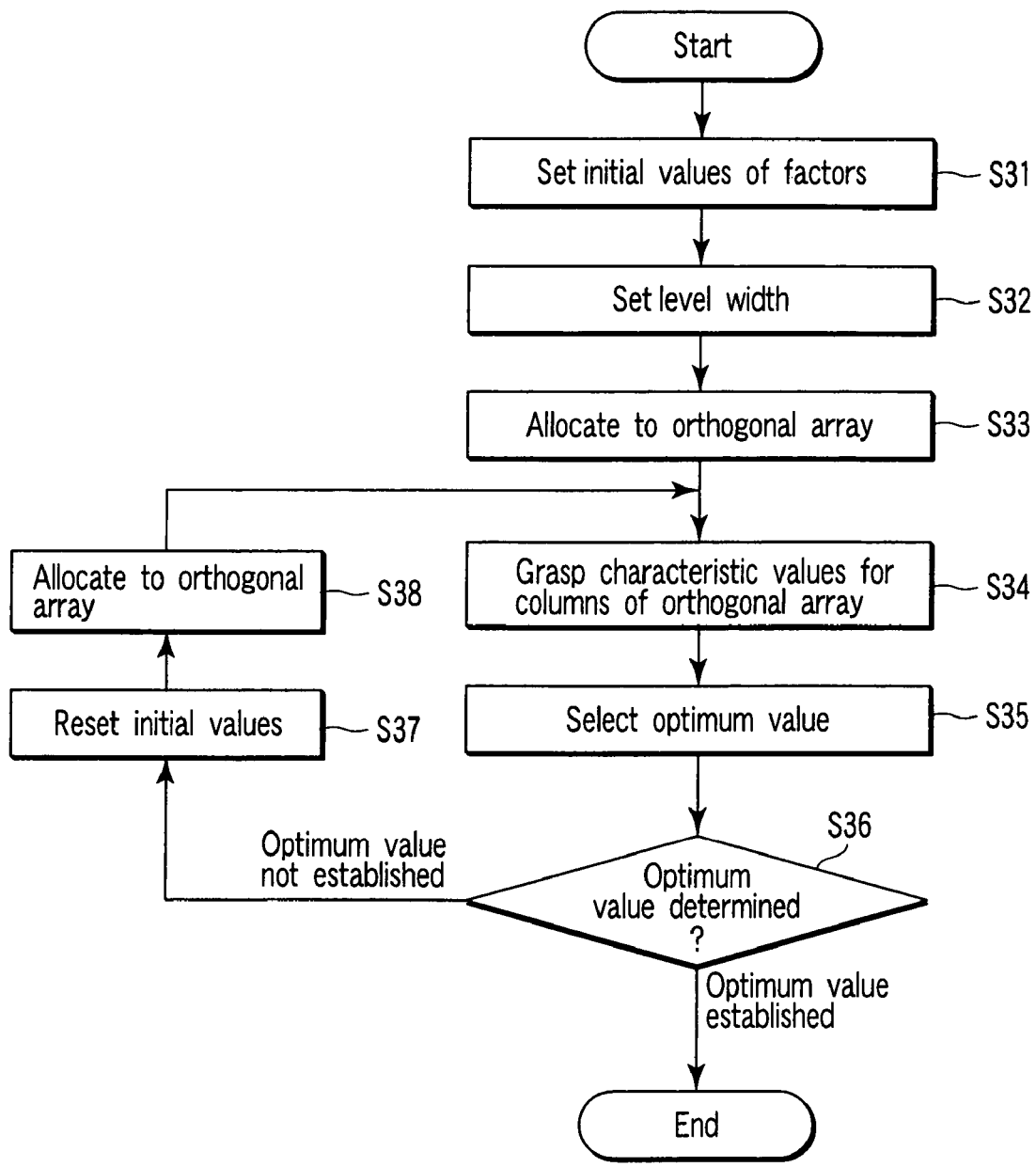
FIG. 7 is a flowchart showing the steps of processing executed by an optimum value search apparatus using an optimum value search method according to the first embodiment.

FIG. 7 is a flowchart showing the steps of processing executed by an optimum value search apparatus using an optimum value search method according to the first embodiment.

This flowchart includes step S31 of setting the initial values of factors that have effects on a device characteristic, step S32 of setting a level width, step S33 of allocating the factors to an orthogonal array, step S34 of obtaining characteristic values on the basis of combinations on the orthogonal array, step S35 of selecting an optimum value with a most excellent characteristic from the obtained characteristic values, step S36 of determining the obtained optimum value, step S37 of resetting the initial values if no optimum value is established in step S36, and step S38 of allocating the initial values reset in step S37 to the orthogonal array and returning to the process in step S34. These steps will be described below in detail.

In step S31, the initial value of each of a plurality of factors of a device to be designed, analyzed, or tested is set. In step S32, an orthogonal array suitable for the number of factors and the number of levels is selected. In step S33, the factors are allocated to the orthogonal array. The orthogonal array suitable for allocation is selected in consideration of the number of design factors and the number of levels.

Figure 8:
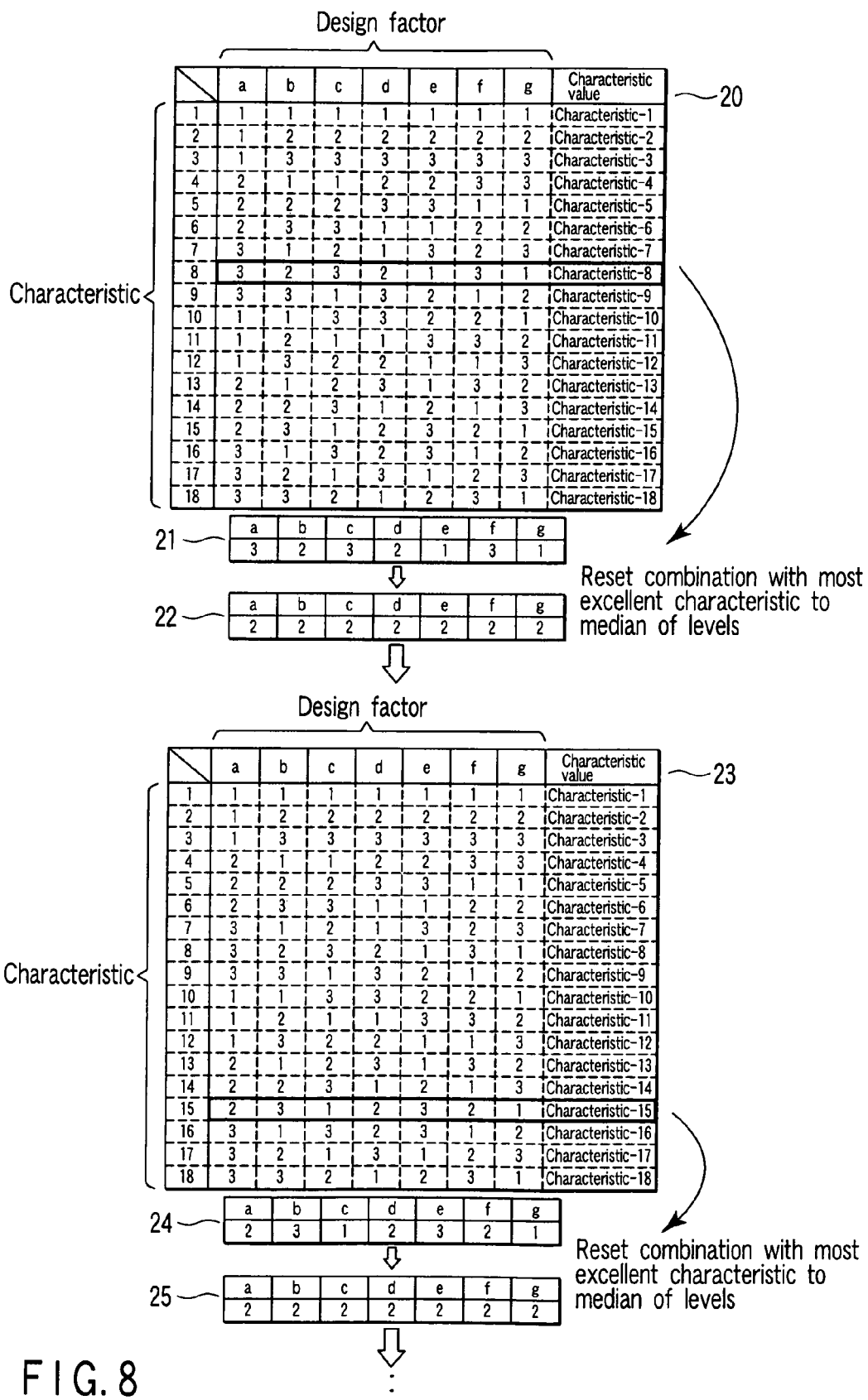
FIG. 8 is a view for explaining a method of searching for an optimum value by using an orthogonal array.

A table 20 shown in FIG. 8 indicates an example wherein seven design factors a to g are allocated to an L18 orthogonal table which has (characteristic-1) to (characteristic-18) as characteristic values. Each design factor has three levels. The level values are represented by 1, 2, and 3 in the orthogonal array. An orthogonal array that combines factors in a well-balanced manner can suitably be used to grasp the characteristic of a device having a plurality of factors by a small number of combinations.

In step S34, characteristic values are obtained for combinations on the orthogonal array. In step S35, an optimum value with a most excellent characteristic is selected from the characteristic values obtained in step S34. First, as indicated by the table 20 in FIG. 8, characteristic values (characteristic-1) to (characteristic-18) are obtained for combinations on the orthogonal array (S34). An optimum value with a most excellent characteristic is selected from the resultant characteristic values (characteristic-1) to (characteristic-18) (S35). As indicated by, e.g., a partial table 21 in FIG. 8, when the combination of (characteristic-8), i.e., $$(a,b,c,d,e,f,g)=(3,2,3,2,1,3,1)$$

has a most excellent characteristic, this combination is selected as the first optimum value of factors.

The method of determining the optimum value in step S36 will be described later. The method of resetting the initial values in step S37 will be described next.

In step S37, the optimum value selected in step S35, i.e., $$(a,b,c,d,e,f,g)=(3,2,3,2,1,3,1)$$

is reset to the median of levels, as indicated by a partial table 22 in FIG. 8.

$$(a,b,c,d,e,f,g)=(3,2,2,1,3,1)=(2,2,2,2,2,2)$$

In step S38, the reset optimum values are allocated to generate a new orthogonal array indicated by, i.e., a table 23 in FIG. 8. The process returns to step S34 to obtain the characteristic values (characteristic-1) to (characteristic-18) on the basis of combinations on the new orthogonal array.

In step S34, as indicated by, e.g., a partial table 24 in FIG. 8 of the new orthogonal array generated by allocation in step S38, when the combination of (characteristic-15), i.e., $$(a,b,c,d,e,f,g)=(2,3,1,2,3,2,1)$$

has a most excellent characteristic, this combination is selected as the second optimum value of factors in step S35.

In step S36, it is determined whether to establish the optimum value of factors as the final optimum value. In this determination, for example, the obtained optimum value is compared with the precedingly obtained optimum value (e.g., the optimum value obtained for the second time is compared with that obtained for the first time). If the characteristic of the obtained optimum value serving as an index is lower than that of the precedingly obtained optimum value, or the repetitive number of times of process in steps S34 to S38 has reached a restriction count set in advance, a final optimum value is established, although the determination method is not limited to this. If it is determined that the value is not the optimum value, the process advances to step S37. The combination is reset to the median of levels, as indicated by a partial table 25 in FIG. 8.

$$(a,b,c,d,e,f,g)=(2,3,1,2,3,2,1)=(2,2,2,2,2,2)$$

In step S38, the reset optimum values are allocated to generate a new orthogonal array. The process returns to step S34 to obtain the characteristic values (characteristic-1) to (characteristic-18) on the basis of combinations on the new orthogonal array. An optimum value is searched for by repeating the processes in steps S34 to S38.

Figure 9:
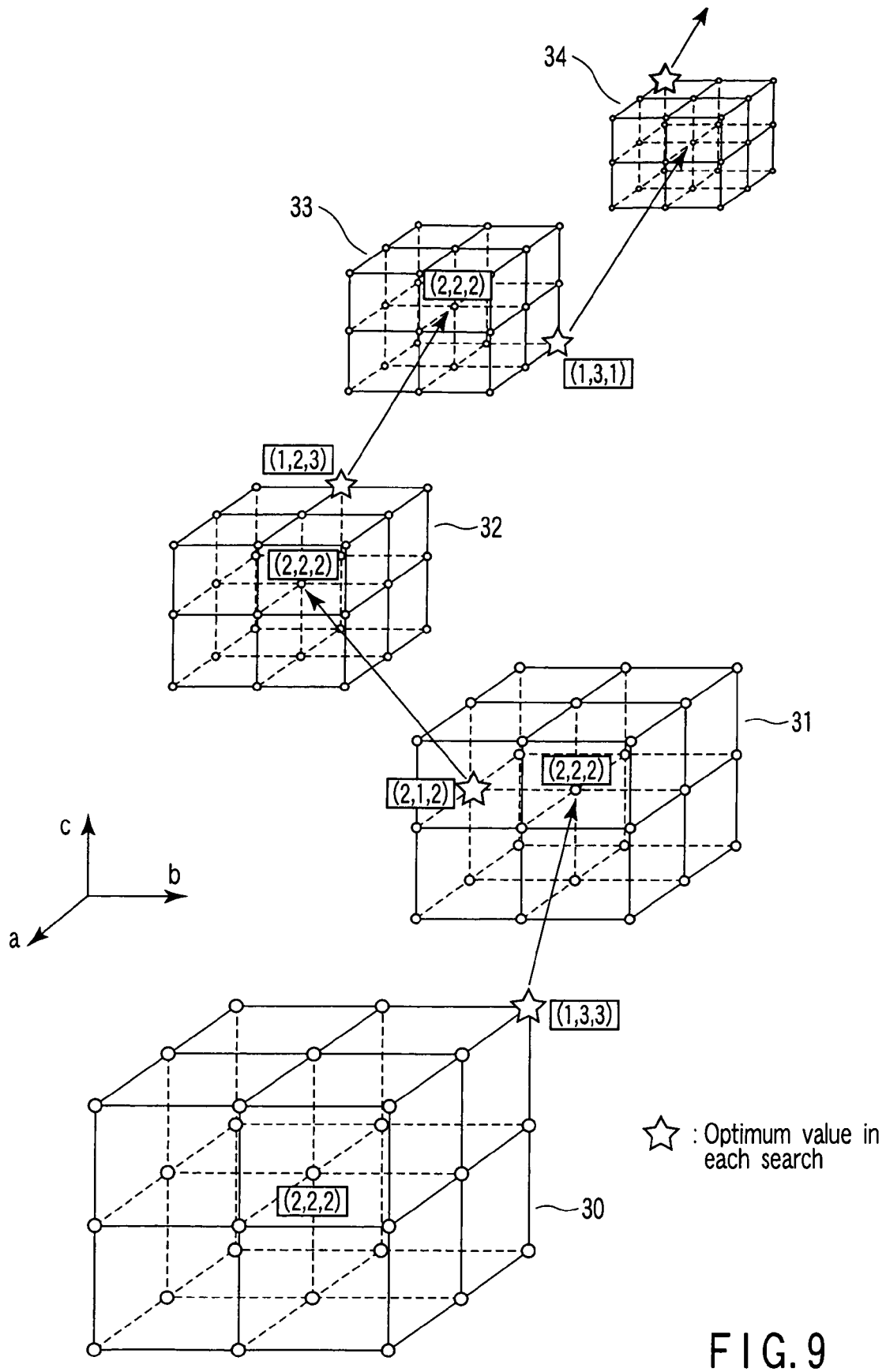
FIG. 9 is a conceptual diagram for explaining a method of searching for an optimum value by expressing combinations on the orthogonal array as the vertices and median of a rectangular region.

FIG. 9 is a view for explaining the embodiment of the present invention by expressing combinations on the orthogonal array as the vertices and median of a rectangular region.

FIG. 9 shows an example wherein an L27 orthogonal table having combinations of three levels of three design factors a to c is selected. The level values of the design factors a to c are defined as 1, 2, and 3. The central coordinates of the rectangular region are (2,2,2), as indicated by a rectangular region 30 in FIG. 9. A method of obtaining characteristic values on the basis of combinations on the L27 orthogonal array and selecting an optimum value with a most excellent characteristic from the obtained characteristic values will be described.

If a design factor combination (a,b,c)=(1,3,3) has a most excellent characteristic, as indicated by the rectangular region 30 in FIG. 8, this combination is selected as the first optimum value of factors. Next, as indicated by the rectangular regions 30 and 31 in FIG. 9, the obtained optimum value of factors is set to the median of levels ((a,b,c)=(1,3,3)=(2,2,2)) to generate a new orthogonal array, and an optimum value is searched for. If a combination (a,b,c)=(2,1,2) has a most excellent characteristic, this combination is selected as the second optimum value of factors. As indicated by the rectangular regions 31 and 32 in FIG. 9, the optimum value is set to the median of levels ((a,b,c)=(2,1,2)=(2,2,2)), like the first optimum value, to generate a new orthogonal array, and an optimum value is searched for.

When (a,b,c)=(1,2,3) is obtained as the third optimum value of factors, it is set to the median of levels ((a,b,c)=(1,2,3)=(2,2,2)), as indicated by the rectangular regions 32 and 33 in FIG. 9, to generate a new orthogonal array, and an optimum value is searched for. When (a,b,c)=(1,3,1) is obtained as the fourth optimum value of factors, it is set to the median of levels ((a,b,c)=(1,3,1)=(2,2,2)), as indicated by the rectangular regions 33 and 34 in FIG. 9, to generate a new orthogonal array, and an optimum value is searched for. A global optimum value is obtained by repeating such optimum value search.

As described above, the optimum value search apparatus using the optimum value search method according to the first embodiment can obtain a global optimum value by a small number of times of calculation or trial on the basis of the above-described functions.

Second Embodiment

FIG. 10 is a flowchart showing the steps of processing executed by an optimum value search apparatus using an optimum value search method according to the second embodiment.

This flowchart includes step S31 of setting the initial values of factors that have effects on a device characteristic, step S32 of setting a level width, step S33 of allocating the factors to an orthogonal array, step S44 of obtaining S/N ratios on the basis of combinations on the orthogonal array, step S35 of selecting an optimum value from the S/N ratios obtained in step S44, step S36 of determining the obtained optimum value, step S37 of resetting the initial values if no optimum value is established in step S36, and step S38 of allocating the initial values reset in step S37 to the orthogonal array and returning to the process in step S34. The same step numbers as in the flowchart of FIG. 7 denote the same processes in FIG. 10. The process in step S44 will be described here.

In this embodiment, the process in step S44 is executed by using an S/N ratio as the reference to select an optimum value. An S/N ratio is generally defined by a function f.

$$S/N \text{ ratio}=f((\text{characteristic value})^2/(\text{standard deviation})^2)$$

That is, as a feature, optimization based on S/N ratios considers not only the levels of characteristic values but also standard deviation, i.e., an index representing a "variation" in characteristic values. The magnitude of a "variation" can be represented by, e.g., the tolerance of each factor.

Figure 11:
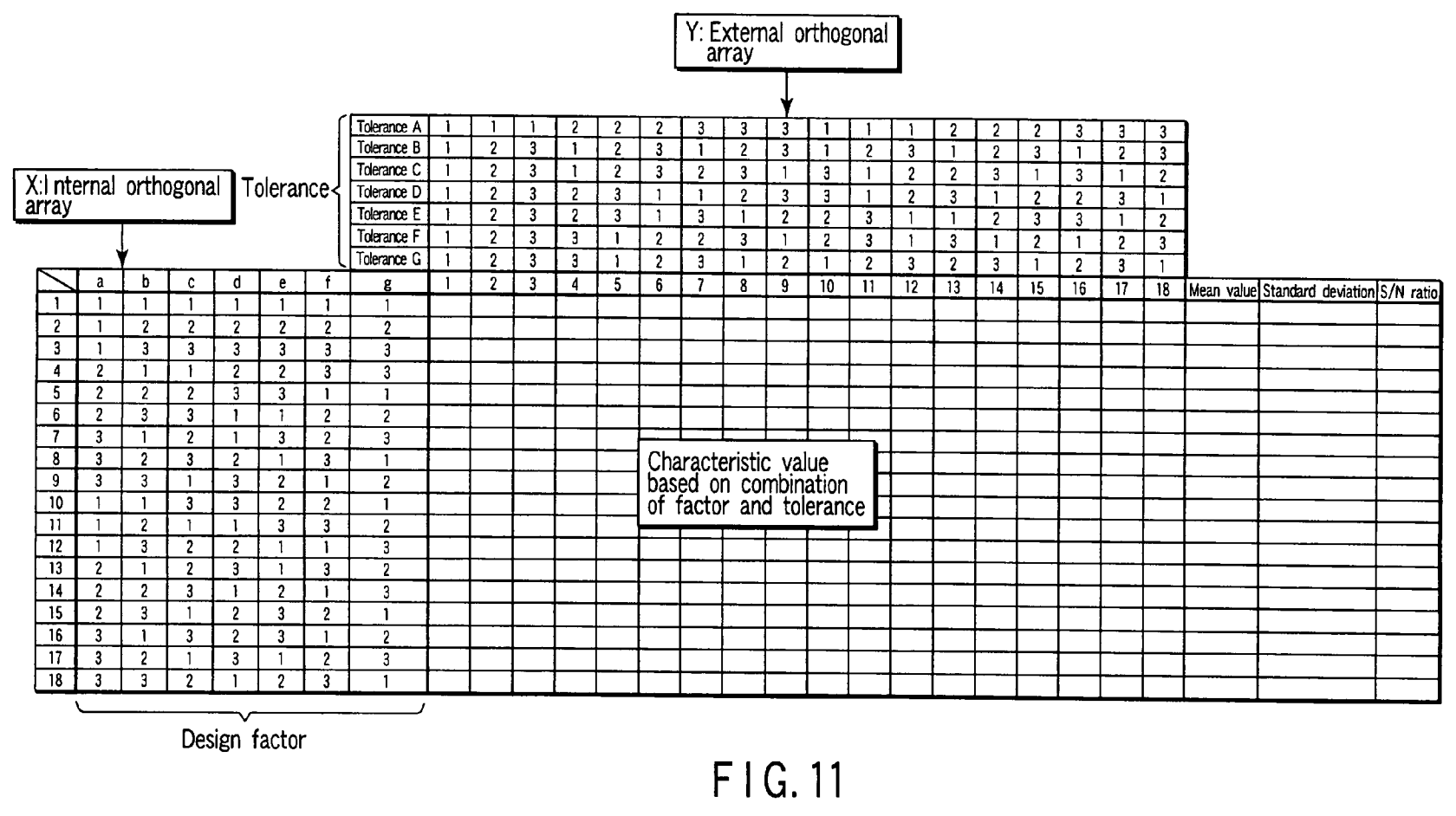

FIG. 11 shows an orthogonal array example wherein combinations of design factors a to g are allocated to an internal orthogonal array X, and combinations of tolerances A to G of the design factors are allocated to an external orthogonal array Y. S/N ratios are calculated by obtaining characteristic values based on the combinations on the orthogonal array. A combination of factors with the highest one of calculated S/N ratios is selected as the optimum value of the search.

Figure 12:
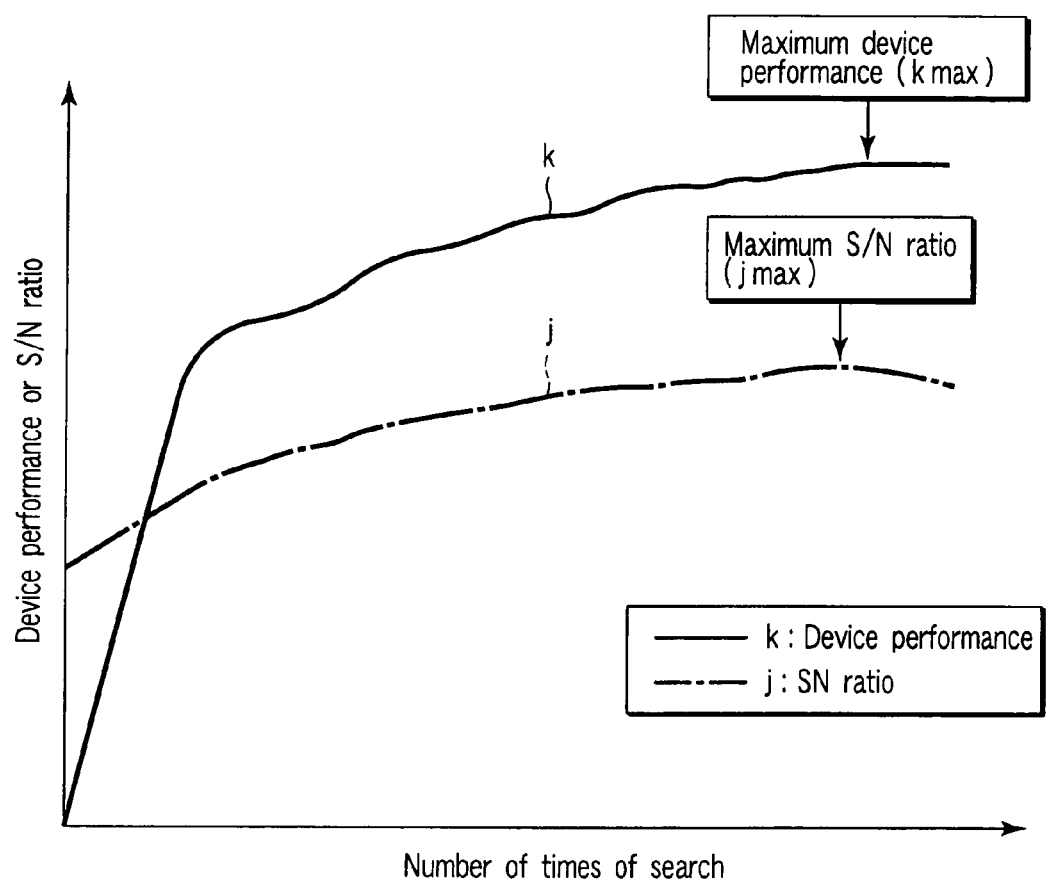
FIG. 12 is a graph showing an example of the relationship between the number of times of search and device performance or S/N ratio obtained by using the method according to the second embodiment.

FIG. 12 is a graph showing an example of the relationship between the number of times of search and device performance or S/N ratio obtained by using the method according to the second embodiment. In the example shown in FIG. 12, as is apparent from a device performance curve k and S/N ratio curve j, the position (number of times of search) of the optimum value to ensure a maximum device performance ($k_{max}$) is different from that of the optimum value to ensure a maximum S/N ratio ($j_{max}$). Use of the S/N ratio as the evaluation index of optimum values enables to obtain an optimum value excellent in robustness considering the "variation" of each factor.

As described above, the optimum value search apparatus using the optimum value search method according to the second embodiment can obtain a global optimum value by a small number of times of calculation or trial on the basis of the above-described functions.

Third Embodiment

Figure 13:
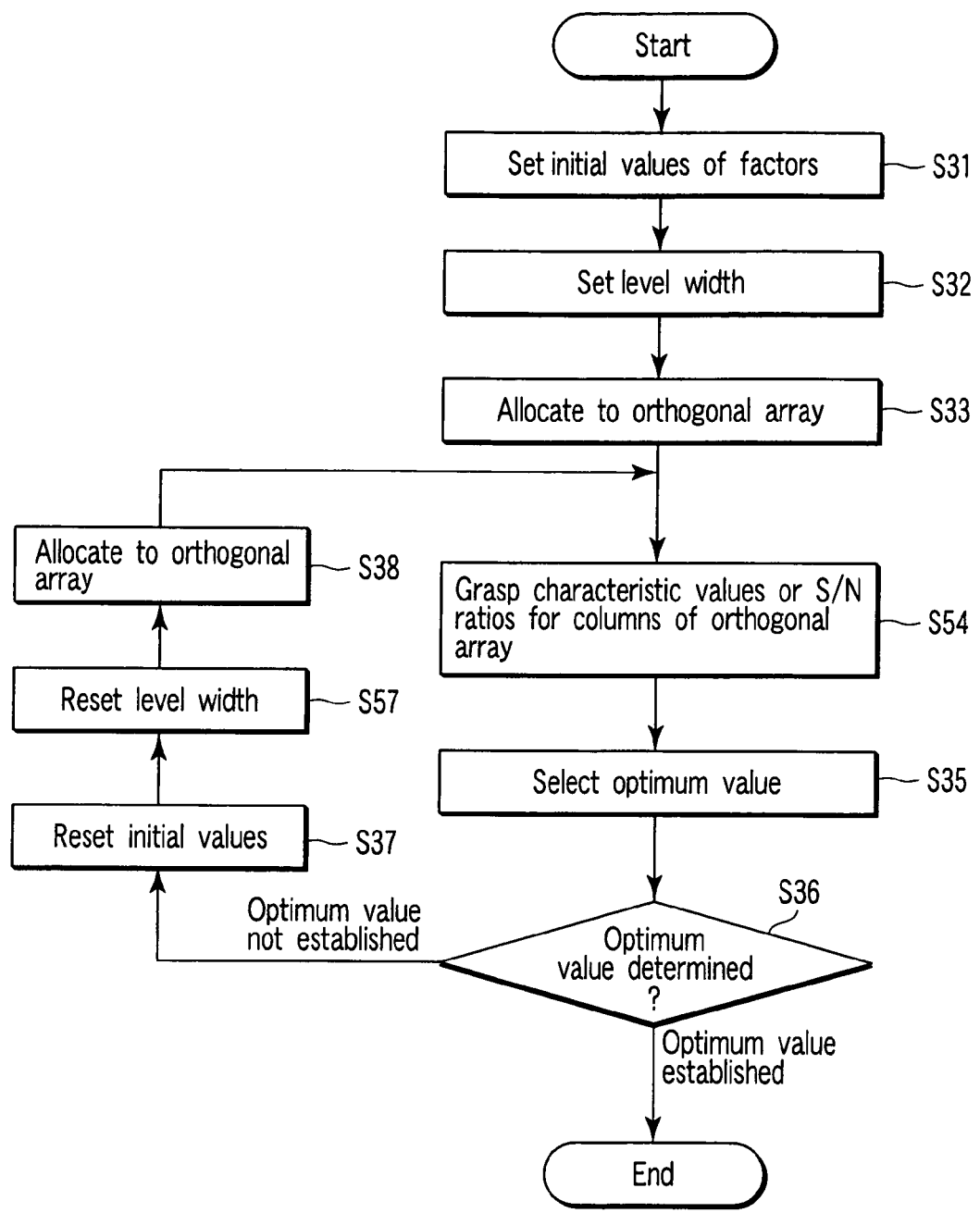
FIG. 13 is a flowchart showing the steps of processing executed by an optimum value search apparatus using an optimum value search method according to the third embodiment.

FIG. 13 is a flowchart showing the steps of processing executed by an optimum value search apparatus using an optimum value search method according to the third embodiment.

This flowchart includes step S31 of setting the initial values of factors that have effects on a device characteristic, step S32 of setting a level width, step S33 of allocating the factors to an orthogonal array, step S54 of obtaining characteristic values or S/N ratios on the basis of combinations on the orthogonal array, step S35 of selecting an optimum value from the obtained characteristic values or S/N ratios, step S36 of determining the obtained optimum value, step S37 of resetting the initial values if no optimum value is established in step S36, step S57 of resetting the level values, and step S38 of allocating the level values to the orthogonal array and returning to the process in step S54. The same step numbers as in the flowchart of FIG. 7 denote the same processes in FIG. 13. The processes in steps S54 and S57 will be described here.

In this embodiment, characteristic values or S/N ratios are used in step S54 as the reference to select an optimum value. In step S57, the level width of factors is changed. The S/N ratio calculation method is the same as that described in the second embodiment.

Figure 14:
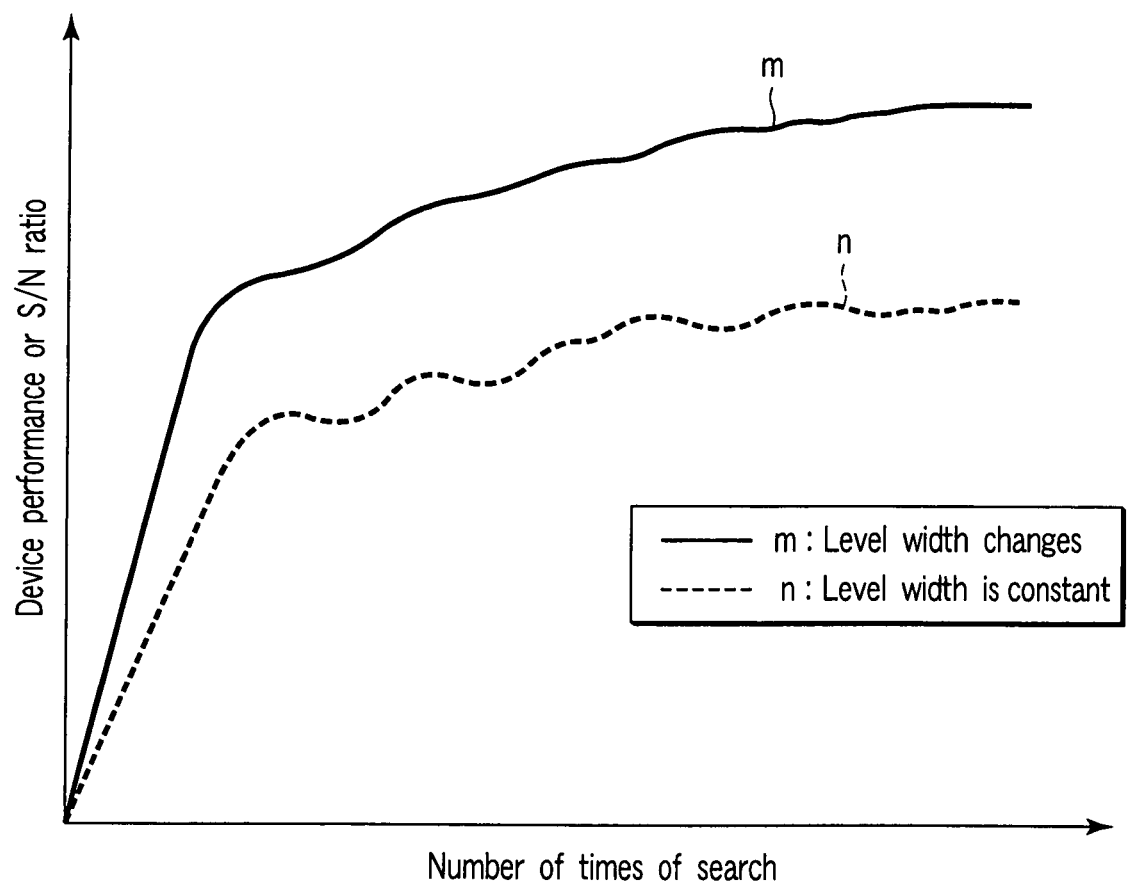
FIG. 14 is a graph showing an example of the relationship between the number of times of search and device performance or S/N ratio obtained by using the method according to the third embodiment.
Figure 15:
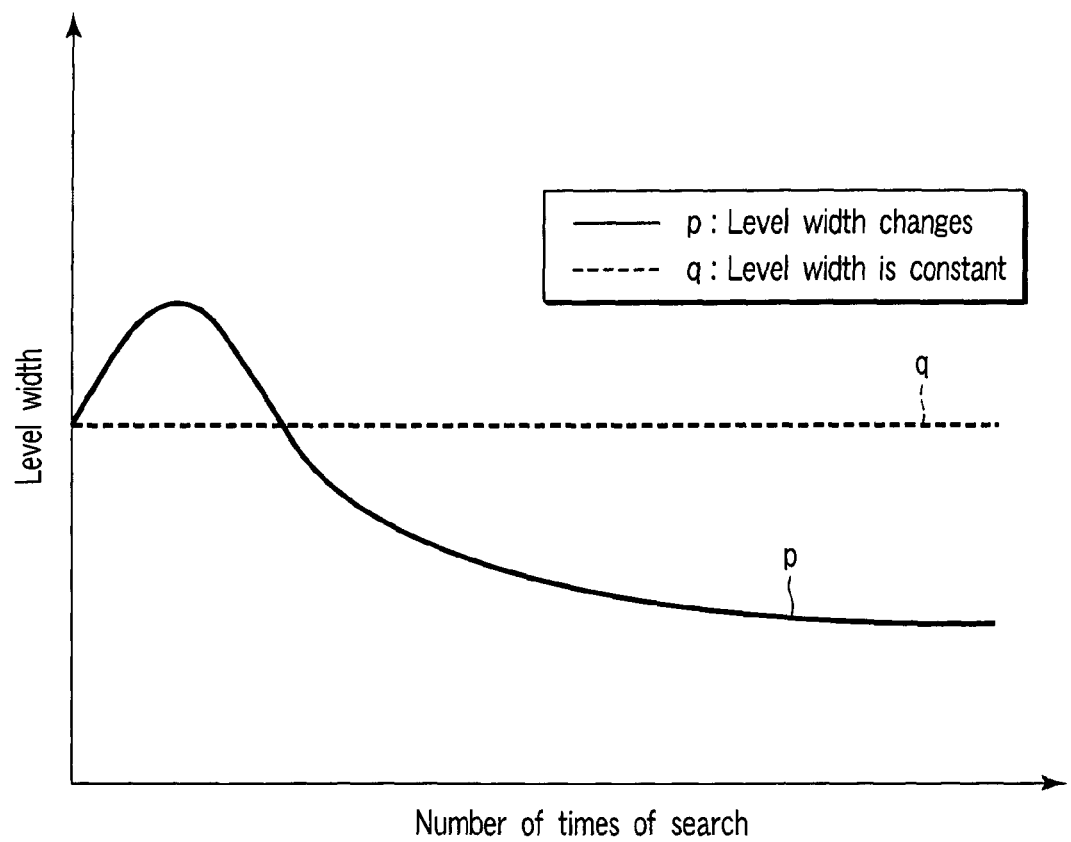
FIG. 15 is a graph showing an example of a change in level width according to the third embodiment.

FIG. 14 is a graph showing an example of the relationship between the number of times of search and device performance or S/N ratio obtained by using the method according to the third embodiment. A curve m indicates a characteristic when the level width is changed. A curve n indicates a characteristic when the level width is constant. FIG. 15 is a graph showing an example of how to change the level width used for optimization in FIG. 14. A curve p indicates a pattern of a change in level width. A line q indicates a constant level width.

Referring to FIG. 14, the curve m indicates a larger value than the curve n. This reveals that the optimum value reach level is higher when the level width is changed than when the level width is constant. Hence, as indicated by the curve p in FIG. 15, in the initial search range where the optimum value of the device performance or S/N ratio exhibits a linear characteristic with respect to a change in factor, it is possible to approach an optimum value by a smaller number of times of search by using a large level width. On the other hand, when the search progresses to a range where a nonlinear characteristic is exhibited near the optimum value, it is possible to obtain a global optimum value by setting a small level width.

As an example of how to change the level width in step S57, when the variation of the optimum value obtained upon every search is larger than the variation in the preceding search, the level width is made larger than in the preceding search. When the variation of the optimum value is smaller than the variation in the preceding search, the level width is made smaller than in the preceding search. For example, a level width W(n) in the search of nth time can be obtained as a function of optimum values (opt) by the search of (n−1)th and (n−2)th times, as indicated by $$W(n)=f(opt(n-1),opt(n-2)) \times W(n-1)$$

In the above-described example, the level width is obtained from the optimum values of two generations. It is also possible to decide the level width from the optimum values of three or more generations.

As described above, the optimum value search apparatus using the optimum value search method according to the third embodiment can obtain a global optimum value by a small number of times of calculation or trial on the basis of the above-described functions.

Fourth Embodiment

Figure 16:
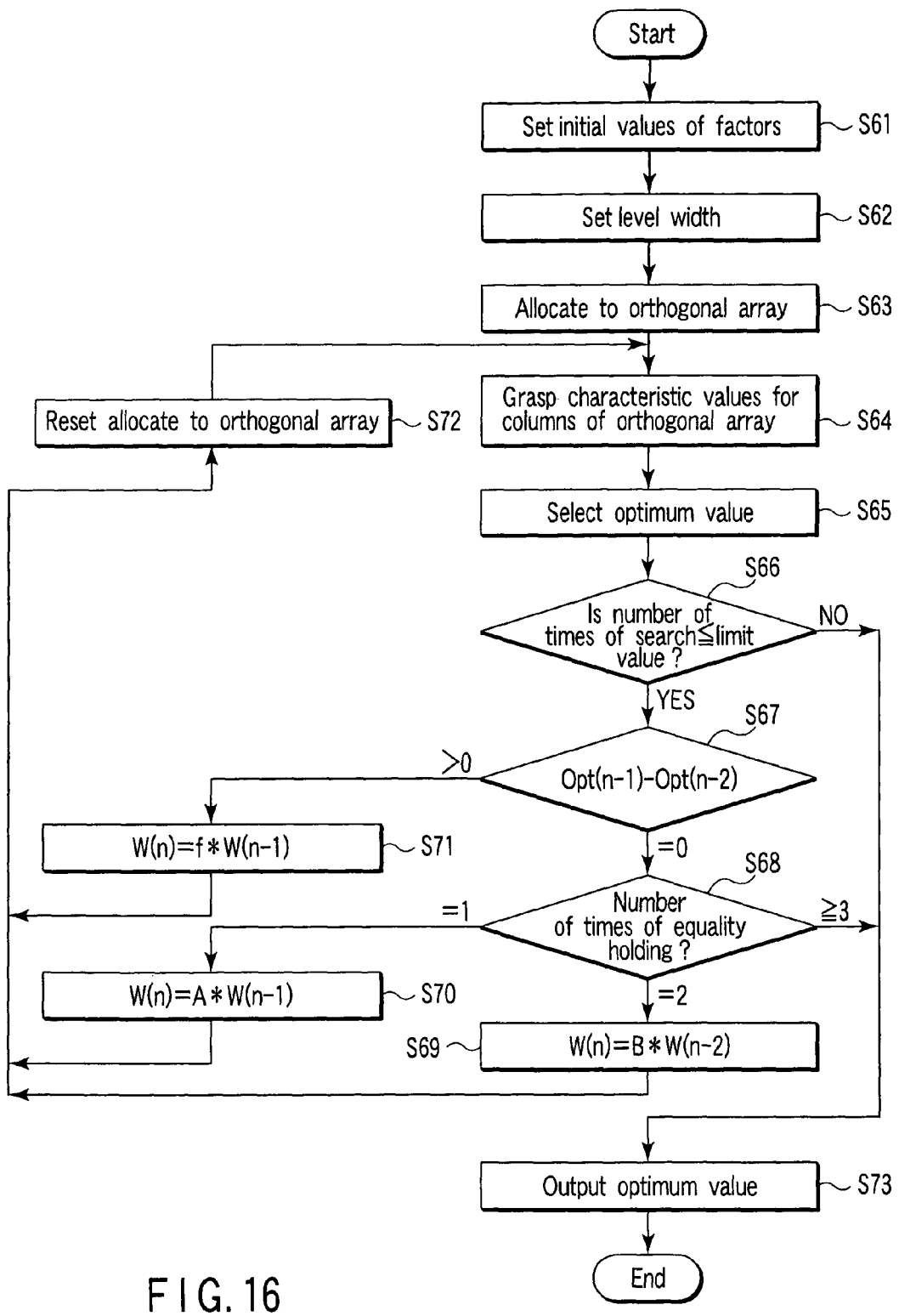
FIG. 16 is a flowchart showing the steps of processing of an optimum value search method according to the fourth embodiment.

FIG. 16 is a flowchart showing the steps of processing of an optimum value search method according to the fourth embodiment of the present invention.

The flowchart shown in FIG. 16 includes step S61 of setting the initial values of factors that have effects on a device characteristic, step S62 of setting a level width, step S63 of allocating the factors to an orthogonal array, step S64 of obtaining characteristic values on the basis of combinations on the orthogonal array, step S65 of selecting an optimum value with a most excellent characteristic from the obtained characteristic values, steps S66 to S68 of confirming the number of times of search, steps S69 to S71 of deciding the level width for the next step from the obtained optimum value, step S72 of repeatedly reallocating the factors to the orthogonal array to obtain characteristic values, and step S73 of outputting an optimum value.

Figure 17:
FIG. 17 is a view for explaining a method of searching for an optimum value by using an orthogonal array.
Figure 17:

In step S61, the initial value of each of a plurality of factors of a device to be designed, analyzed, or tested is set. In step S62, the level width is set. In step S63, an orthogonal array suitable for the number of factors and the number of levels is selected, and the factors are allocated to the orthogonal array. The orthogonal array suitable for allocation is selected in consideration of the number of design factors and the number of levels. FIG. 17 shows an example wherein seven design factors a to g are allocated to an L18 orthogonal table. Each design factor has three levels. The level values are represented by 1, 2, and 3 in the orthogonal array. An orthogonal array that combines factors in a well-balanced manner can suitably be used to grasp the characteristic of a device having a plurality of factors by a small number of combinations.

In step S64, characteristic values are obtained for combinations on the orthogonal array. In step S65, an optimum value with a most excellent characteristic is selected from the obtained characteristic values. As indicated by a table 61 in FIG. 17, (characteristic-1) to (characteristic-18) are obtained for combinations on the orthogonal array. An optimum value with a most excellent characteristic is selected from the resultant characteristic values (characteristic-1) to (characteristic-18). As indicated by, e.g., a partial table 62 in FIG. 17, when the combination of (characteristic-8), i.e., $$(a,b,c,d,e,f,g)=(3,2,3,2,1,3,1)$$

has a most excellent characteristic, this combination is selected as the first optimum value of factors.

Next, as indicated by a partial table 63 in FIG. 17, the obtained optimum value of factors is set to the median of levels like $$(a,b,c,d,e,f,g)=(3,2,3,2,1,3,1)=(2,2,2,2,2,2,2)$$

to generate a new orthogonal array. The characteristic values (characteristic-1) to (characteristic-18) are obtained on the basis of combinations on the orthogonal array.

As indicated by, e.g., a partial table 64 in FIG. 17, when the combination of (characteristic-15), i.e., $$(a,b,c,d,e,f,g)=(2,3,1,2,3,2,1)$$

has a most excellent characteristic, this combination is selected as the second optimum value of factors, as indicated by a partial table 65 in FIG. 17. Next, in step S66, as indicated by a partial table 66 in FIG. 17, $$(a,b,c,d,e,f,g)=(2,3,1,2,3,2,1)=(2,2,2,2,2,2,2)$$

is defined to set the obtained optimum value of factors to the median of levels. A new orthogonal array is generated repeatedly in this way to search for an optimum value within the limited number of times of search.

FIG. 18 is a view showing a situation wherein a global optimum value is searched for in the fourth embodiment. For the descriptive convenience, the number of design factors is set to one, and it has three levels. Referring to FIG. 18, #1 is the starting point, and #15 is the optimum value reach point. The length of the horizontal line in each search indicates the level width (the difference between adjacent level values). Trap by a local optimum value occurs at #4, though the value escapes from it at #5 by increasing the level width. The value stops near the global optimum value at #8 and #9. At #10, search is resumed to obtain the global optimum value by setting a small level width.

How to change the level width of an orthogonal array, which has a large effect on optimum value search of this embodiment, will be described next.

The target is the process from a determination formula "Opt(n−1)−Opt(n−2)" in step S67 of FIG. 16. Opt(n−1) represents the optimum value in the search of (n−1)th time, and Opt(n−2) represents the optimum value in the search of (n−2)th time. First, the difference between the optimum values obtained by the search of (n−1)th and (n−2)th times is determined. When ΔOpt=Opt(n−1)−Opt(n−2)>0 (>0 in step S67), the optimum value search progresses. Hence, in step S71, a level width W(n) for the next search is obtained by using equation (1) in which the optimum values by the search of (n−1)th and (n−2)th times are used as a function.

$$W(n)=f(opt(n-1),opt(n-2))\times W(n-1) \quad (1)$$

The factors are reallocated to the orthogonal array by using this level width (step S72), and the process returns to step S64.

A function f of equation (1) is set to make the level width larger than in the preceding step if the variation of the optimum value is large and smaller than in the preceding step if the variation of the optimum value is small. The reason for this is as follows. In a search process where the variation of the optimum value exhibits a large characteristic, it is possible to approach an optimum value by a small number of times of search by using a large level width. On the other hand, in a search process where the variation of the optimum value exhibits a small characteristic, it is possible to approach an optimum value of high level by using a small level width.

When ΔOpt=0, i.e., when the optimum value in the current search equals that in the preceding search (=0 in step S67), trap by a local optimum value may have occurred. Hence, the search range is made wider or narrower than in the preceding search. In step S68, if equality between optimum values holds for the first time (=1 in step S68), the level width W(n) for the next step is decided by equation (2) (step S70).

$$W(n)=A\times W(n-1) \quad (2)$$

The factors are reallocated to the orthogonal array by using this level width (step S72), and the process returns to step S64.

A constant A of equation (2) is arbitrarily set within the range of A>1.0. This search process corresponds to #5 in FIG. 18. Although trap by a local optimum value occurs at #4, search in the peak of a global optimum value G far from the current optimum value starts upon increasing the level width. If it is possible to search for the slant of the peak including the global optimum value by increasing the level width on the basis of equation (2), the global optimum value can then be obtained on the basis of the change in level width by equation (1).

If equality between optimum values holds for the second time (=2 in step S68), i.e., if the optimum value does not change even upon making the level width large, the global optimum value may exist near the current optimum value. Hence, the level width is decreased by equation (3) (step S69).

$$W(n)=B\times W(n-2) \quad (3)$$

The factors are reallocated to the orthogonal array by using this level width (step S72), and the process returns to step S64.

A constant B of equation (3) is arbitrarily set within the range of B<1.0. This search process corresponds to #10 in FIG. 18. The search stops at #8 and #9 near the global optimum value. However, the search is resumed at #10 by decreasing the level width on the basis of equation (3) so that the global optimum value is obtained. Note that the order of equations (2) and (3) may reverse. More specifically, when equality between optimum values holds for the first time, the level width may be made small. When equality between optimum values holds for the second time, the level width may be made large.

If equality between optimum values holds for the third or subsequent time (≧3 in step S68), i.e., if the optimum value does not change even upon making the level width large or small, the current optimum value is determined to be the global optimum value G and output (step S73), and the calculation ends. Even when the number of times of search exceeds the limit in step S66 (NO in step S66), the current optimum value is determined to be the global optimum value G and output (step S73), and the calculation ends.

The level width changing method and the number of times of equality holding in convergence determination can change depending on the characteristic of a target problem.

As described above, according to the optimum value search method of the fourth embodiment, the level width that has an effect on the search range is changed in each search step on the basis of the trend of optimum value. Hence, a global optimum value is obtained by a small number of times of search at a high probability.

Fifth Embodiment

Figure 19:
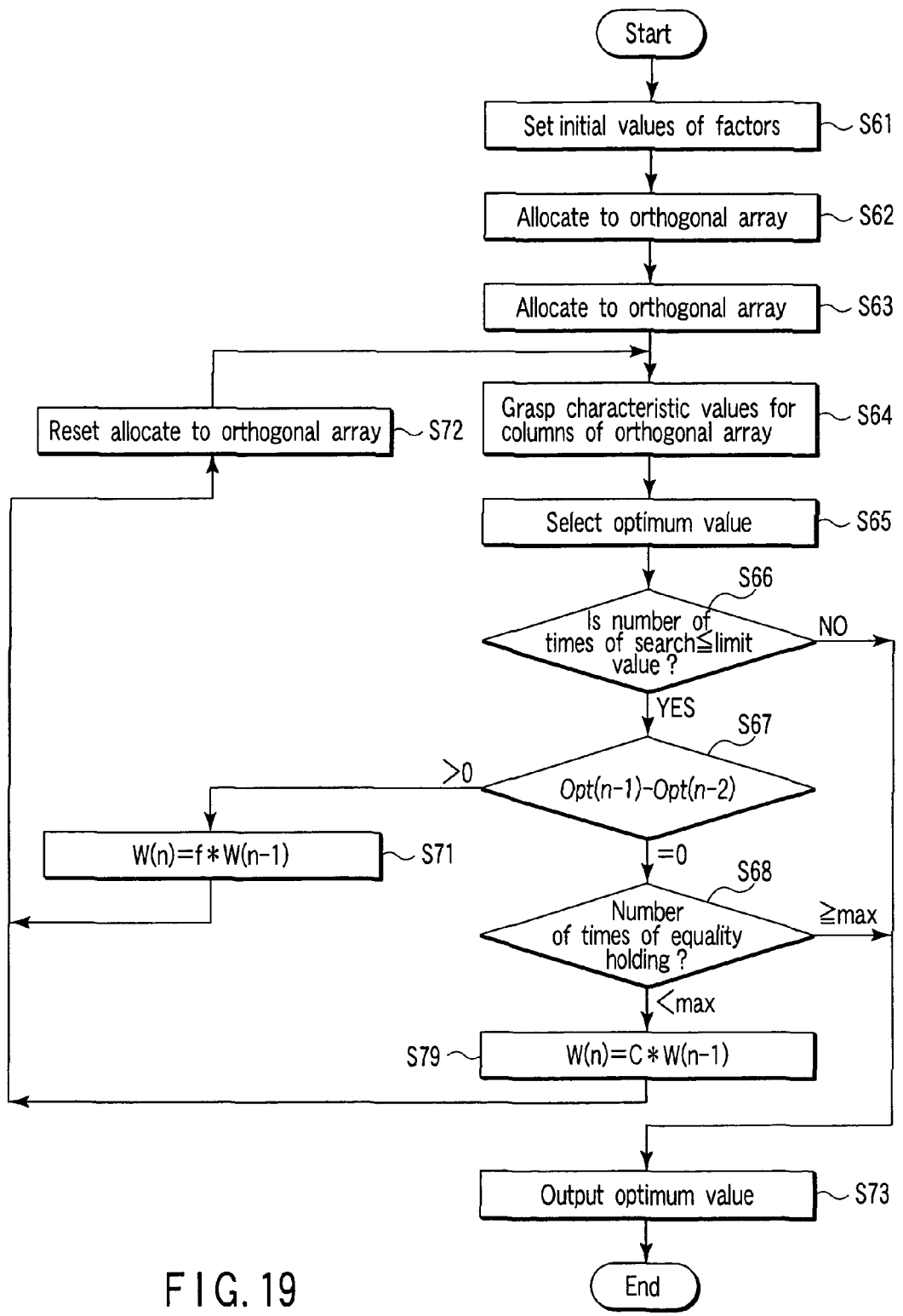
FIG. 19 is a flowchart showing the steps of processing of an optimum value search method according to the fifth embodiment.

FIG. 19 is a flowchart showing the steps of processing of an optimum value search method according to the fifth embodiment of the present invention.

The optimum value search method of the fifth embodiment is different from the fourth embodiment only in the method of deciding a level width W(n) for the next step when equality holds between optimum values. The same step numbers as in the fourth embodiment denote the same processes in FIG. 19. Only different points will be described here by avoiding a repetitive description.

In the fifth embodiment, for step S68 of the flowchart in FIG. 19, the maximum value of the number of times of equality holding is set in advance. Before the number of times of equality holding reaches the maximum value (<max in step S68), the level width is decided on the basis of equation (4) (step S79).

$$W(n)=C \times W(n-1) \qquad (4)$$

Figure 20:
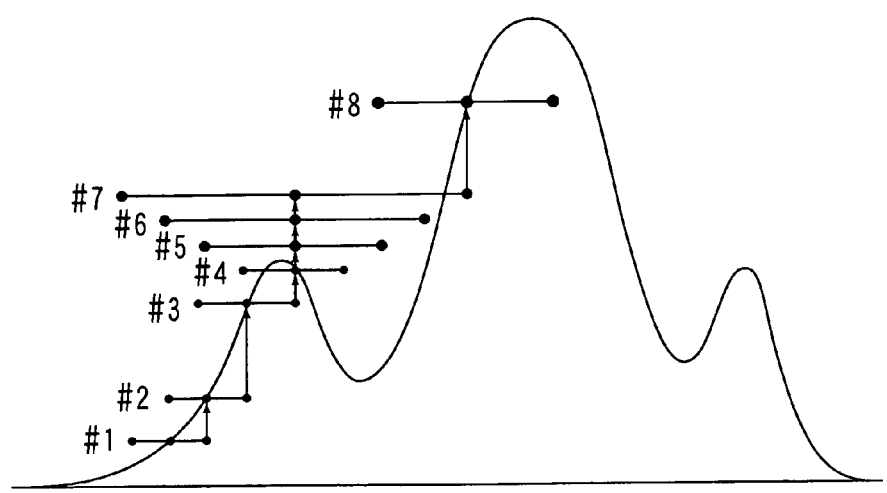
FIG. 20 is a view showing a situation wherein an optimum value is searched for by continuously changing the level width of an orthogonal array.

A constant C of equation (4) is arbitrarily set within the ranges of C<1.0 and C>1.0. This search process corresponds to #4 to #7 in FIG. 20. Trap near a local optimum value occurs at #4. However, when the level width gradually increases on the basis of equation (4), it is possible to search for the slant of a peak including the global optimum value. The global optimum value can then be obtained on the basis of the change in level width by equation (1). If the optimum value does not change even at the maximum value of the preset number of times of equality holding (≧max in step S68), the current optimum value is determined to be a global optimum value G and output (step S73), and the calculation ends.

To verify the effectiveness of the optimum value search method (to be referred to as "this method" hereinafter) according to the above-described fourth and fifth embodiments, search results obtained by this method for an optimum value search problem by two kinds of functions, which is used as a benchmark of an optimization method, were compared with search results obtained by another method. An objective function that simulates a unimodal function and a constraint are given by $$f(x_1,x_2)=\cos(x_1) \times \cos(x_2) \times \exp(-(x_1,-\pi)^2-(x_2-\pi)^2) \qquad (5)$$

$$-20 < x_1,x_2 < 20 \qquad (6)$$

Figure 21:
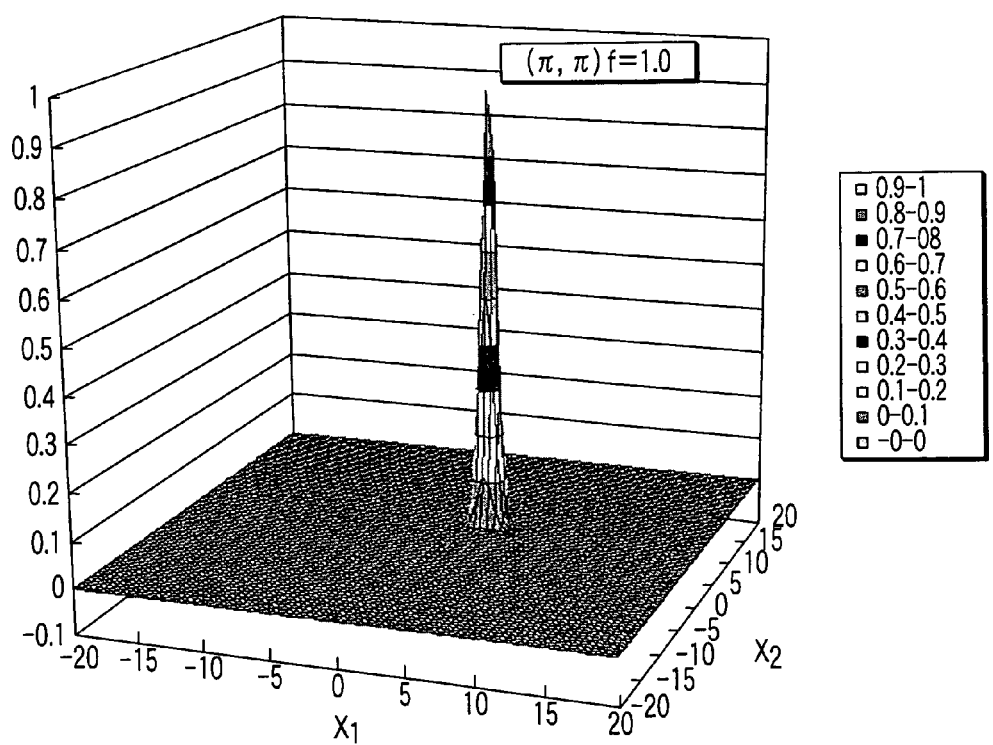
FIG. 21 is a 3D diagram of a unimodal function used to verify the effect of the optimum value search method of the present invention.

FIG. 21 shows a 3D diagram.

Figures 22, 23:
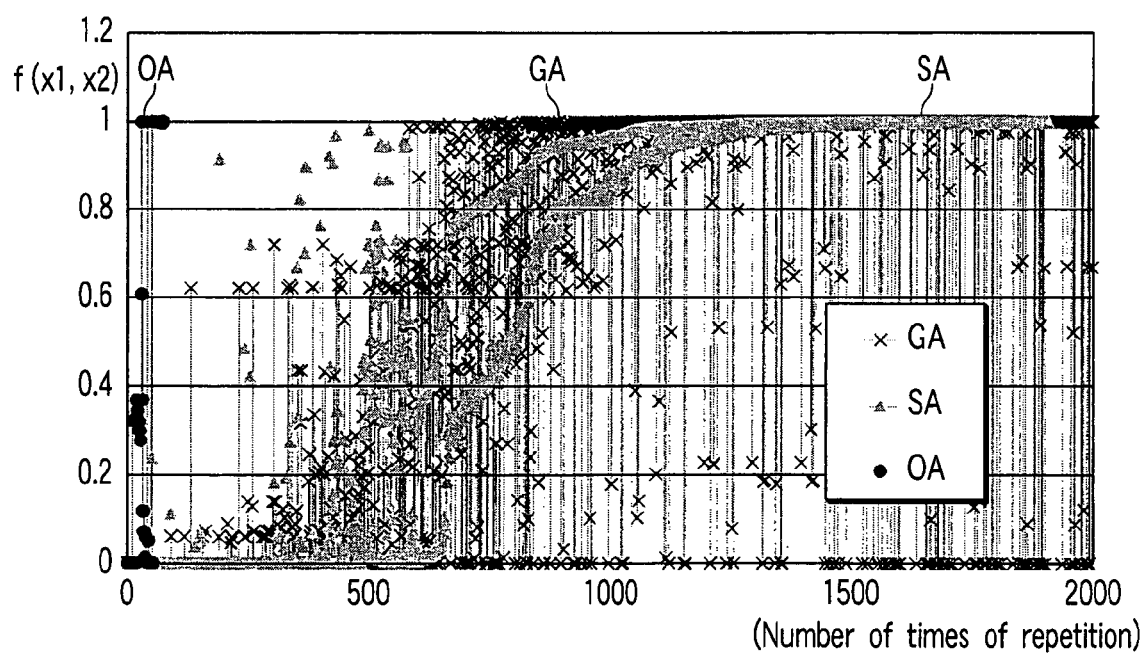
FIG. 22 is an L9 orthogonal array used to verify the effect of the optimum value search method of the present invention.
FIG. 23 is a graph showing comparison of optimum value search results for the unimodal function.

When $x_1=x_2=\pi$, a global optimum value G of this function is given by $f(x_1,x_2)=1.0$. Since the optimum value exists in a very narrow range, how to reach the optimum value by a small number of times of search is important. This method defined two factors, i.e., $x_1$ and $x_2$. An L9 orthogonal array of 2-factor/3-level shown in FIG. 22 was used. Calculation was done by generating a program on the basis of the flowchart in FIG. 16. FIG. 23 shows comparison of optimum value search results between this method (OA: Orthogonal Array), genetic algorithm (GA), and simulated annealing (SA). The abscissa represents the number of times of calculation, and the ordinate represents $f(x_1,x_2)$. All the three methods can reach $f(x_1,x_2)=1.0$, through the number of times of calculation until the reach largely differs between them. In this method (OA), the optimum value is obtained by calculation of 100 or less times. The genetic algorithm (GA) requires calculation of about 1,000 times. The simulated annealing (SA) requires calculation of about 1,500 times.

An objective function that simulates a multimodal function and a constraint are given by $$f(x_1,x_2)=10 \times \exp(-0.01 \times (x_1-10)^2 - 0.01 \times (x_2-15)^2 \times \sin(x_1)) \qquad (7)$$

$$-10 < x_1,x_2 < 40 \qquad (8)$$

Figure 24:
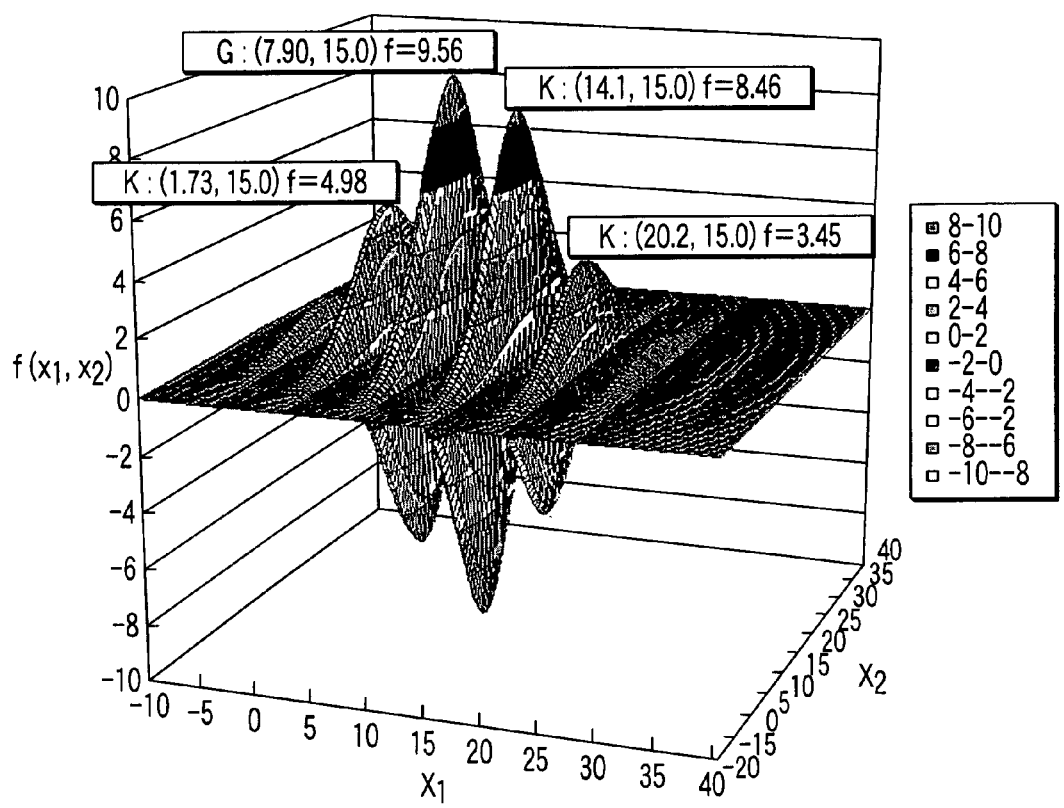
FIG. 24 is a 3D diagram of a multimodal function used to verify the effect of the optimum value search method of the present invention.

FIG. 24 shows a 3D diagram.

Figure 25:
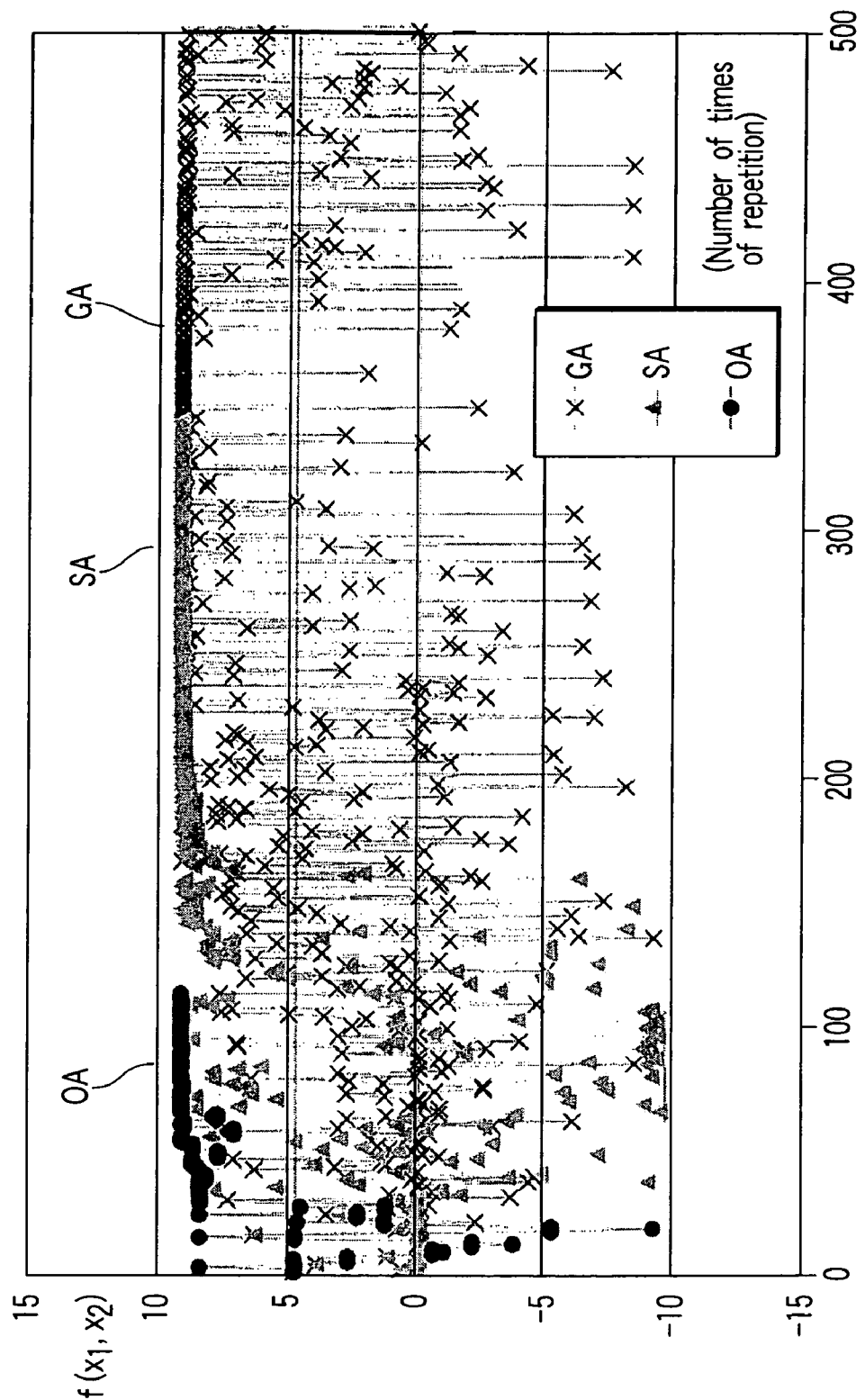
FIG. 25 is a graph showing comparison of optimum value search results for the multimodal function.

When $x_1=7.90$, and $x_2=15.0$, the global optimum value G of this function is given by $f(x_1,x_2)=9.56$. Since a plurality of local optimum values K exist, as shown in FIG. 24, how to reach the global optimum value is important. Even in this case, two factors, i.e., $x_1$ and $x_2$ were defined. In this method, an L9 orthogonal array of 2-factor/3-level shown in FIG. 22 was used. Calculation was done by generating a program on the basis of the flowchart in FIG. 16. Methods compared with this method are genetic algorithm (GA) and simulated annealing (SA), as in the unimodal function search problem. FIG. 25 shows the optimum value search results of this method (OA), genetic algorithm (GA), and simulated annealing (SA). The abscissa represents the number of times of calculation, and the ordinate represents $f(x_1,x_2)$. As can be seen from FIG. 25, all the three methods can reach $f(x_1,x_2)=9.56$, through the number of times of calculation differs. In this method (OA), the optimum value is obtained by calculation of about 100 times. The genetic algorithm (GA) and simulated annealing (SA) require calculation of about 350 times. As described above, in the unimodal and multimodal optimum value search problems, it was confirmed that the optimum value search method of the fifth embodiment has a search capability superior to the conventional methods.

The best mode for carrying out the present invention have been described above with reference to the accompanying drawings. The present invention is not limited to the above-described arrangements. Various changes and modifications will readily occur to those skilled in the art within the technical scope of the inventive concept as defined by the appended claims, and the changes and modifications are incorporated in the technical scope of the present invention.

The present invention can implement an apparatus, method, recording medium, and computer program product capable of searching for a global optimum value by a small number of times of calculation or trial.

What is claimed is:

1. An optimum value search apparatus used in designing, analyzing, or testing a device having a plurality of factors that have effects on a characteristic, comprising:
   a computer and a recording medium, the recording medium storing a program that causes the computer to:
   prepare an orthogonal array which sets level values obtained from initial values of the factors to coordinates of a two-dimensional table including a matrix of the characteristics and the factors;
   select, from the characteristics on the orthogonal array, a combination of level values of the factors to maximize a Signal-to-Noise (S/N) ratio as a function based on the level values of the factors of a single characteristic and a standard deviation with reference to the level values of the factors of the single characteristic;
   reset, in the orthogonal array, the level values of the factors in the characteristic corresponding to the selected combination; and
   search for an optimum value as a most excellent one of the characteristic values by repeatedly selecting a combination of level values after resetting the level values.

2. The optimum value search apparatus according to claim 1, wherein the recording medium further stores a program that cause the computer to change a width of the level value of each factor in every search.

3. The optimum value search apparatus according to claim 2, wherein the recording medium further stores a program that causes the computer to determine the width of the level value to be changed in every search on the basis of an optimum value obtained in every search.

4. The optimum value search apparatus according to claim 3, wherein the recording medium further stores a program that causes the computer to change the width of the level value such that when a variation of the optimum value obtained in every search is larger than a variation of an optimum value obtained in immediately preceding search, the width of the level value is made larger than the width of the level value in the immediately preceding search, and when the variation of the optimum value obtained in every search is smaller than the variation of the optimum value obtained in immediately preceding search, the width of the level value is made smaller than the width of the level value in the immediately preceding search.

5. An optimum value search method used in designing, analyzing, or testing a device having a plurality of factors that have effects on a characteristic, comprising:
   a selection step, performed in a calculator main body, of selecting, from the characteristics on an orthogonal array, a combination of level values of the factors to maximize a Signal-to-Noise (S/N) ratio as a function based on the level values of the factors of a single characteristic and a standard deviation with reference to the level values of the factors of the single characteristic, the orthogonal array setting level values obtained from initial values of the factors to coordinates of a two-dimensional table including a matrix of the characteristics and the factors;
   a resetting step, performed in the calculator main body, of resetting, in the orthogonal array, the level values of the factors in the characteristic corresponding to the combination selected in the selection step; and
   a search step, performed in the calculator main body, of searching for an optimum value as a most excellent one of the characteristic values by repeatedly executing selection in the selection step after resetting in the resetting step.

6. An optimum value search method according to claim 5, wherein a width of the level value of each factor is changed in every search in the search step.

7. An optimum value search method according to claim 6, wherein the width of the level value to be changed in every search is decided on the basis of an optimum value obtained in every search in the search step.

8. An optimum value search method according to claim 7, wherein when a variation of the optimum value obtained in every search is larger than a variation of an optimum value obtained in immediately preceding search, the width of the level value is made larger than the width of the level value in the immediately preceding search, and when the variation of the optimum value obtained in every search is smaller than the variation of the optimum value obtained in immediately preceding search, the width of the level value is made smaller than the width of the level value in the immediately preceding search.

9. A non-transitory computer-readable recording medium which records a program applied to an optimum value search apparatus used in designing, analyzing, or testing a device having a plurality of factors that have effects on a characteristic, the program causing a computer to execute:
   a selection procedure of selecting, from the characteristics on an orthogonal array, a combination of level values of the factors to maximize a Signal-to-Noise (S/N) ratio as a function based on the level values of the factors of a single characteristic and a standard deviation with reference to the level values of the factors of the single characteristic, the orthogonal array setting level values obtained from initial values of the factors to coordinates of a two-dimensional table including a matrix of the characteristics and the factors;
   a resetting procedure of resetting, in the orthogonal array, the level values of the factors in the characteristic corresponding to the combination selected by the selection procedure; and
   a search procedure of searching for an optimum value as a most excellent one of the characteristic values by repeatedly executing selection by the selection procedure after resetting by the resetting procedure.

10. The non-transitory computer-readable recording medium according to claim 9, which records the program that causes the computer to further execute a width changing procedure of changing a width of the level value of each factor in every search by the search procedure.

11. The non-transitory computer-readable recording medium according to claim 10, which records the program that causes the computer to further execute a width decision procedure of deciding, on the basis of an optimum value obtained in every search by the search procedure, the width of the level value to be changed in every search by the width changing procedure.

12. The non-transitory computer-readable recording medium according to claim 11, which records the program that causes the computer to further execute a width adjustment procedure of making the width of the level value larger than the width of the level value in the immediately preceding search when a variation of the optimum value obtained in every search by the search procedure is larger than a variation of an optimum value obtained in immediately preceding search, and making the width of the level value smaller than the width of the level value in the immediately preceding search when the variation of the optimum value obtained in every search is smaller than the variation of the optimum value obtained in immediately preceding search.

13. A computer program product used in designing, analyzing, or testing a device having a plurality of factors that have effects on a characteristic, the computer program product comprising:
   a non-transitory computer-readable medium that includes:
      a code that causes a computer to select, from the characteristics on an orthogonal array, a combination of level values of the factors to maximize a Signal-to-Noise (S/N) ratio as a function based on the level values of the factors of a single characteristic and a standard deviation with reference to the level values of the factors of the single characteristic, the orthogonal array setting level values obtained from initial values of the factors to coordinates of a two-dimensional table including a matrix of the characteristics and the factors;
      a code that causes the computer to reset, in the orthogonal array, the level values of the factors in the characteristic corresponding to the selected combination; and
      a code that causes the computer to search for an optimum value as a most excellent one of the characteristic values by repeatedly executing selection of a combination after resetting of the level values.

14. The computer program product according to claim 13, wherein the non-transitory computer-readable medium further comprises a code that causes the computer change a width of the level value of each factor in every search.

15. The computer program product according to claim 14, wherein the non-transitory computer-readable medium further comprises a code that causes the computer to determine, on the basis of an optimum value obtained in every search, the width of the level value to be changed in every search.

16. The computer program product according to claim 15, wherein the non-transitory computer-readable medium further comprises code that causes the computer to make the width of the level value larger than the width of the level value in the immediately preceding search when a variation of the optimum value obtained in every search is larger than a variation of an optimum value obtained in immediately preceding search, and to make the width of the level value smaller than the width of the level value in the immediately preceding search when the variation of the optimum value obtained in every search is smaller than the variation of the optimum value obtained in immediately preceding search.

17. An optimum value search apparatus, comprising:
a computer; and
a recording medium, the recording medium storing a program that causes the computer to search for an optimum value, in designing, analyzing, or testing a device having a plurality of factors, by executing a generation step of generating an orthogonal array by allocating the factors that have effects on a characteristic of the device and level values obtained from initial values of the factors, a selection step of selecting an optimum value having a most excellent characteristic from characteristic values obtained on the basis of combinations on the orthogonal array, and a regeneration step of generating an orthogonal array by resetting, to the initial values of the factors, a combination of the level values of the factors that ensure the optimum value selected in the selection step, and then repeatedly executing the selection step using the orthogonal array generated in the regeneration step and executing the regeneration step,
wherein if an optimum value selected in the current selection step equals an optimum value selected in the preceding selection step, the program causes the computer to change a value of a level width, which is a difference between adjacent level values in the orthogonal array, between an orthogonal array to be used in the next selection step and an orthogonal array used in the current selection step; and
the value of the level width is changed on the basis of a number of times of equality holding between optimum values selected in a predetermined number of selection steps.

18. The optimum value search apparatus according to claim 17, wherein the program causes the computer to represent the level width in an orthogonal array to be used in an nth (n is an integer: n≧2) selection step by a function $W(n)$ which is given by $W(n)=A\times W(n-1)$, $A>1.0$ upon equality holding of first time between the optimum values selected in the selection steps and by $W(n)=B\times W(n-2)$, $B<1.0$ upon equality holding of second time.

19. The optimum value search apparatus according to claim 17, wherein the program causes the computer to represent the level width in an orthogonal array to be used in an nth (n is an integer: n≧2) selection step by a function $W(n)$ which is given by $W(n)=B\times W(n-1)$, $B<1.0$ upon equality holding of first time between the optimum values selected in the selection steps and by $W(n)=A\times W(n-2)$, $A>1.0$ upon equality holding of second time.

20. The optimum value search apparatus according to claim 17, wherein the program causes the computer to represent the level width in an orthogonal array to be used in an nth (n is an integer: n≧2) selection step by a function $W(n)$ which is given by $W(n)=C\times W(n-1)$, $C<1.0$ or $C>1.0$ after equality holding between some of the optimum values selected in the selection steps until the selection step is repeated a predetermined number of times.

21. An optimum value search method of searching for an optimum value, in designing, analyzing, or testing a device having a plurality of factors, by executing a generation step, performed in a calculator main body, of generating an orthogonal array by allocating the factors that have effects on a characteristic of the device and level values obtained from initial values of the factors, a selection step, performed in the calculator main body, of selecting an optimum value having a most excellent characteristic from characteristic values obtained on the basis of combinations on the orthogonal array, and a regeneration step, performed in the calculator main body, of generating an orthogonal array by resetting, to the initial values of the factors, a combination of the level values of the factors that ensure the optimum value selected in the selection step, and then repeatedly executing the selection step using the orthogonal array generated in the regeneration step and executing the regeneration step,
wherein if an optimum value selected in the current selection step equals an optimum value selected in the preceding selection step, a value of a level width as a difference between adjacent level values in the orthogonal array is changed between an orthogonal array to be used in the next selection step and an orthogonal array used in the current selection step, and
the value of the level width is changed on the basis of a number of times of equality holding between optimum values selected in a predetermined number of selection steps.

22. The optimum value search method according to claim 21, wherein the level width in an orthogonal array to be used in an nth (n is an integer: n≧2) selection step is represented by a function $W(n)$ which is given by $W(n)=A\times W(n-1)$, $A>1.0$ upon equality holding of first time between the optimum values selected in the selection steps and by $W(n)=B\times W(n-2)$, $B<1.0$ upon equality holding of second time.

23. The optimum value search method according to claim 21, wherein the level width in an orthogonal array to be used in an nth (n is an integer: n≧2) selection step is represented by a function $W(n)$ which is given by $W(n)=B\times W(n-1)$, $B<1.0$ upon equality holding of first time between the optimum values selected in the selection steps and by $W(n)=A\times W(n-2)$, $A>1.0$ upon equality holding of second time.

24. An optimum value search method according to claim 21, wherein the level width in an orthogonal array to be used in an nth (n is an integer: n≧2) selection step is represented by a function $W(n)$ which is given by $W(n)=C\times W(n-1)$, $C<1.0$ or $C>1.0$ after equality holding between some of the optimum values selected in the selection steps until the selection step is repeated a predetermined number of times.

25. A non-transitory computer-readable recording medium which records a program applied to an optimum value search apparatus which searches for an optimum value, in designing, analyzing, or testing a device having a plurality of factors that have effects on a characteristic, the program causing a computer to execute:
a generation procedure of generating an orthogonal array by allocating the factors that have effects on a characteristic of the device and level values obtained from initial values of the factors in designing, analyzing, or testing the device having the plurality of factors;
a selection procedure of executing a selection step of selecting an optimum value having a most excellent characteristic from characteristic values obtained on the basis of combinations on the orthogonal array;
a regeneration procedure of generating an orthogonal array by resetting, to the initial values of the factors, a combination of the level values of the factors that ensure the optimum value selected by the selection procedure;
a repeating procedure of repeatedly executing the selection procedure using the orthogonal array generated by the regeneration procedure and executing the regeneration procedure; and a level width setting procedure of, if an optimum value selected in the current selection step equals an optimum value selected in the preceding selection step, changing a value of a level width as a difference between adjacent level values in the orthogonal array between an orthogonal array to be used in the next selection step and an orthogonal array used in the current selection step, the level width setting procedure changing the value of the level width on the basis of a number of times of equality holding between optimum values selected in a predetermined number of selection steps.

26. The non-transitory computer-readable recording medium according to claim 25, wherein the level width setting procedure represents the level width in an orthogonal array to be used in an nth (n is an integer: $n \geq 2$) selection step by a function $W(n)$ which is given by $W(n)=A \times W(n-1)$, $A>1.0$ upon equality holding of first time between the optimum values selected in the selection steps and by $W(n)=B \times W(n-2)$, $B<1.0$ upon equality holding of second time.

27. The non-transitory computer-readable recording medium according to claim 25, wherein the level width setting procedure represents the level width in an orthogonal array to be used in an nth (n is an integer: $n \geq 2$) selection step by a function $W(n)$ which is given by $W(n)=B \times W(n-1)$, $B<1.0$ upon equality holding of first time between the optimum values selected in the selection steps and by $W(n)=A \times W(n-2)$, $A>1.0$ upon equality holding of second time.

28. The non-transitory computer-readable recording medium according to claim 25, wherein the level width setting procedure represents the level width in an orthogonal array to be used in an nth (n is an integer: $n \geq 2$) selection step by a function $W(n)$ which is given by $W(n)=C \times W(n-1)$, $C<1.0$ or $C>1.0$ after equality holding between some of the optimum values selected in the selection steps until the selection step is repeated a predetermined number of times.

29. A computer program product used for designing, analyzing, or testing a device having a plurality of factors that have effects on a characteristic, the computer program product comprising:

a non-transitory computer-readable medium that includes:
a code for causing a computer to generate an orthogonal array by allocating the factors that have effects on a characteristic of the device and level values obtained from initial values of the factors in designing, analyzing, or testing the device having the plurality of factors;
a code for causing the computer to select an optimum value having a most excellent characteristic from characteristic values obtained on the basis of combinations on the orthogonal array;
a code for causing the computer to generate an orthogonal array by resetting, to the initial values of the factors, a combination of the level values of the factors that ensure the selected optimum value;
a code for causing the computer to repeatedly execute selection using the orthogonal array generated by the resetting of the combination and then execute the resetting of the combination; and
a code for causing the computer to change, if an optimum value selected currently equals an optimum value selected last, a value of a level width as a difference between adjacent level values in the orthogonal array between an orthogonal array to be used in a next selection and an orthogonal array used in the current selection, wherein the value of the level width being changed on the basis of a number of times of equality holding between optimum values selected in a predetermined number of selection steps.

30. The computer program product according to claim 29, wherein the non-transitory computer-readable medium further comprises a code for causing the computer to represent the level width in an orthogonal array to be used in an nth (n is an integer: $n \geq 2$) selection step by a function $W(n)$ which is given by $W(n)=A \times W(n-1)$, $A>1.0$ upon equality holding of first time between the optimum values selected in the selection steps and by $W(n)=B \times W(n-2)$, $B<1.0$ upon equality holding of second time.

31. The computer program product according to claim 29, wherein the non-transitory computer-readable medium further comprises a code for causing the computer to represent the level width in an orthogonal array to be used in an nth (n is an integer: $n \geq 2$) selection step by a function $W(n)$ which is given by $W(n)=B \times W(n-1)$, $B<1.0$ upon equality holding of first time between the optimum values selected in the selection steps and by $W(n)=A \times W(n-2)$, $A>1.0$ upon equality holding of second time.

32. The computer program product according to claim 29, wherein the non-transitory computer-readable medium further comprises a code that causes the computer to represent the level width in an orthogonal array to be used in an nth (n is an integer: $n \geq 2$) selection step by a function $W(n)$ which is given by $W(n)=C \times W(n-1)$, $C<1.0$ or $C>1.0$ after equality holding between some of the optimum values selected in the selection steps until the selection step is repeated a predetermined number of times.

* * * * *